US012659230B2

(12) United States Patent
Veeraswamy Santhanam et al.

(10) Patent No.:  US 12,659,230 B2
(45) Date of Patent:  Jun. 16, 2026

(54) CONFIGURATION SYSTEM FOR CONFIGURING NETWORKING DEVICES OF A NETWORK

(71) Applicant: HEWLETT PACKARD ENTERPRISE DEVELOPMENT LP, Spring, TX (US)

(72) Inventors: Senthil Kumar Veeraswamy Santhanam, Milpitas, CA (US); Piyush Agarwal, Sunnyvale, CA (US); Dhrumil Hirenkumar Desai, Fremont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 98 days.

(21) Appl. No.: 18/742,286

(22) Filed: Jun. 13, 2024

(65) Prior Publication Data

US 2025/0385837 A1     Dec. 18, 2025

(51) Int. Cl.
| | |
|---|---|
| *G06F 15/177* | (2006.01) |
| *H04L 41/08* | (2022.01) |
| *H04L 41/0893* | (2022.01) |

(52) U.S. Cl.
CPC ...... *H04L 41/0893* (2013.01); *H04L 41/0886* (2013.01)

(58) Field of Classification Search
CPC .................. H04L 41/0893; H04L 41/0886
See application file for complete search history.

*Primary Examiner* — Joseph R Maniwang
(74) *Attorney, Agent, or Firm* — Jones Burke, PLLC

(57)                 ABSTRACT

A method of configuring networking devices of a network may comprise, via a networking device configuring system: defining one or more configuration objects in a configuration library, defining one or more scopes in a scope hierarchy for the network, and defining a mapping of a given configuration object of the configuration objects to a given scope of the scopes. The configuration objects specify configuration properties. Each of the scopes has one or more of the networking devices which belong thereto. The method further includes causing the network configuration system to, in response to the defining of the mapping, apply the configuration properties specified by the given configuration object to the one or more networking devices which belong to the given scope.

20 Claims, 14 Drawing Sheets

Configuration Library 210

Inputs
(e.g., object definitions)

User Interface 218

Outputs
(e.g., display)

Object Store 219

Configuration Object 212_1

Object ID 213

Property 214

⋮

Property 214

Filter 215

⋯

Configuration Object 112_N

Object ID 213

Property 214

⋮

Property 214

Filter 215

Configuration Library 310

Object Store 319

Shared Namespace 315

Configuration Object 312_1

⋮

Local Namespace 316

Configuration Object 312_2

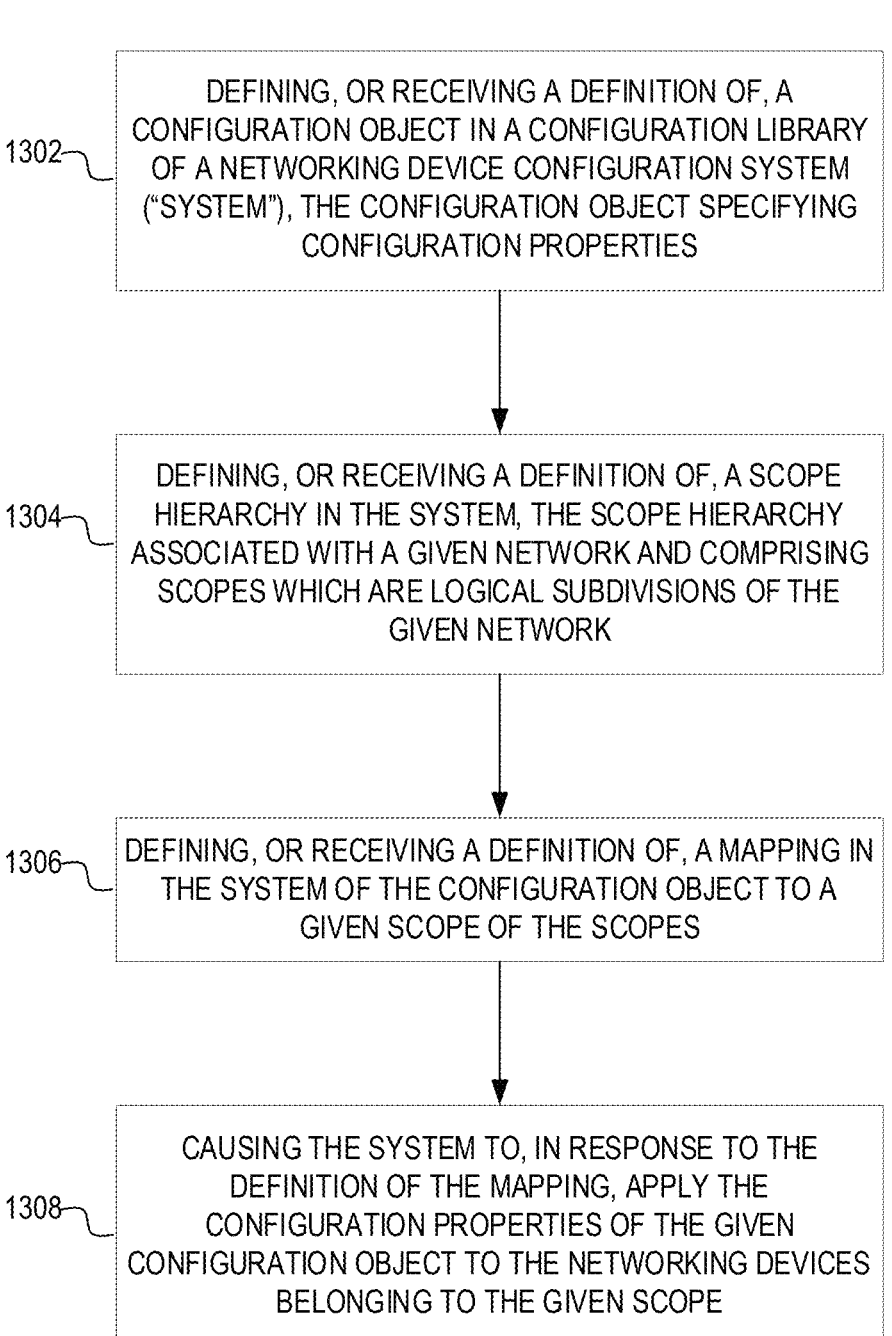

1302 — DEFINING, OR RECEIVING A DEFINITION OF, A CONFIGURATION OBJECT IN A CONFIGURATION LIBRARY OF A NETWORKING DEVICE CONFIGURATION SYSTEM ("SYSTEM"), THE CONFIGURATION OBJECT SPECIFYING CONFIGURATION PROPERTIES

1304 — DEFINING, OR RECEIVING A DEFINITION OF, A SCOPE HIERARCHY IN THE SYSTEM, THE SCOPE HIERARCHY ASSOCIATED WITH A GIVEN NETWORK AND COMPRISING SCOPES WHICH ARE LOGICAL SUBDIVISIONS OF THE GIVEN NETWORK

1306 — DEFINING, OR RECEIVING A DEFINITION OF, A MAPPING IN THE SYSTEM OF THE CONFIGURATION OBJECT TO A GIVEN SCOPE OF THE SCOPES

1308 — CAUSING THE SYSTEM TO, IN RESPONSE TO THE DEFINITION OF THE MAPPING, APPLY THE CONFIGURATION PROPERTIES OF THE GIVEN CONFIGURATION OBJECT TO THE NETWORKING DEVICES BELONGING TO THE GIVEN SCOPE

1400

1500

CONFIGURATION SYSTEM FOR CONFIGURING NETWORKING DEVICES OF A NETWORK

INTRODUCTION

A communication network may comprise multiple networking devices (e.g., switches, access points, routers, etc.) communicably connected to one another and to client devices, such as computers, phones, internet-of-things (IoT) devices, etc. Such networking devices may be capable of various functionalities, such as establishing a wireless local area network (WLAN), establishing a virtual local area network (VLAN), enforcing security policies, enforcing quality of service (QoS) rules, etc. Often, these functionalities depend upon user-specified configuration properties, which enable and/or control the functionality. The act of entering the properties into the networking device may be referred to as "configuring" the networking device. For example, an administrator may configure one or more networking devices to establish a VLAN by entering various configuration properties related to the VLAN into the networking devices, such as specifying an identifier for the VLAN, specifying which ports to include in the VLAN, etc.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operations. In the drawings:

FIG. 4 is a block diagram illustrating an example scope hierarchy manager of a networking device configuration system.

FIG. 13 is a process flow chart illustrating an example method.

DETAILED DESCRIPTION

Figure 1:
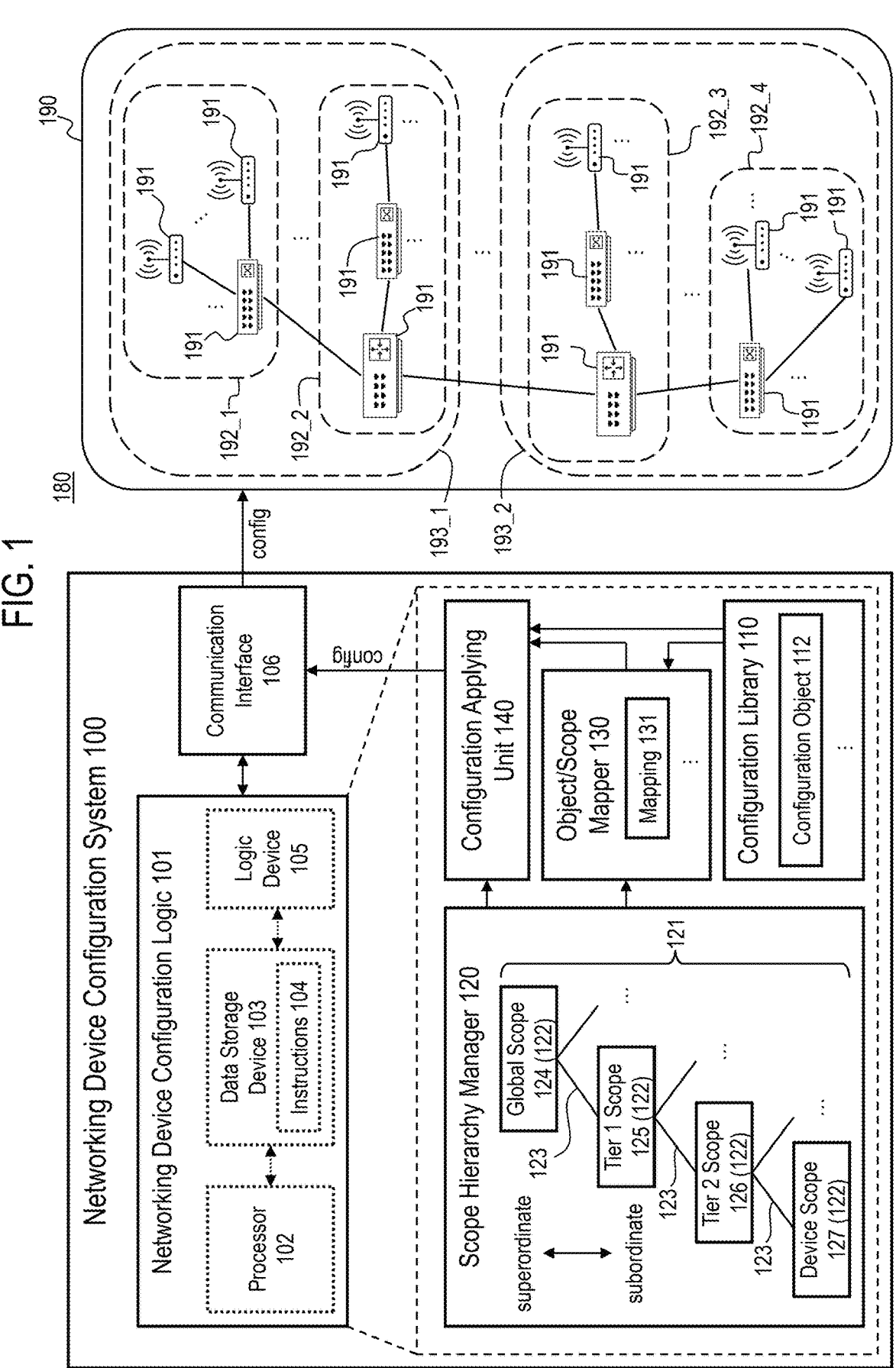
FIG. 1 is a block diagram illustrating an example networking device configuration system.

In a network that includes multiple networking devices, individually configuring the networking devices can be a cumbersome, time-consuming, task, particular in large networks such as large enterprise networks. An administrator may need to provide separate sets of instructions to each of the networking devices to specify the configuration properties which are associated with the respective configurations being made to the networking devices, which will take a great deal of time when there are many networking devices. Furthermore, it is often the case that the same configuration may need to be made to multiple networking devices, and therefore the administrator may have to enter the same configuration information over and over again, which in addition to being time-consuming can be annoying to the administrator. Also, if a given configuration needs to be changed later, the administrator will need to make the corresponding change individually in each networking device which had the given configuration. Manually configuring the networking devices may also require the administrator to keep track of which devices have been configured and in what manner, which can be complicated in large networks which have multiple devices and many different configurations. Moreover, even if the administrator does keep a record of how the individual devices have been configurated, it may be difficult for the administrator or a third party to understand or visualize how the overall network or divisions thereof are configured, because such summary information is hard to discern from the mass of individualized configuration data.

To make the process of configuring networking devices easier, particularly in large networks, disclosed herein are examples of networking device configuration systems which can apply configurations to multiple networking devices without requiring the administrator to individually configure each networking device. In addition, examples disclosed herein can enable the administrator to more easily visualize how the network and its subdivisions are configured. In particular, example configuration systems disclosed herein may allow a user to define shareable configuration objects each having a set of configuration properties, define a hierarchy of scopes (logical subdivisions of a network), and selectively map the configuration objects to the scopes, with the result of the mapping being that the configuration properties of a configuration object are automatically applied to the networking devices belonging to any scope to which the configuration object has been mapped.

In some examples, the networking device configuration system comprises a configuration library in which a user can define the configuration objects. Each configuration object is a data structure which includes a set of one or more configuration properties which are specified by the user for configuring some functionality or other aspect of the networking device. For example, one configuration object could correspond to an SSID configuration, in which case the set of corresponding configuration properties may include an SSID name, a password, etc. As another example, another configuration object could correspond to a VLAN configuration, in which case the set of corresponding configuration properties may include a VLAN identifier, ports to include in the VLAN, etc.

The configuration system may also comprise a scope hierarchy manager. The scope hierarchy manager allows a user to define scopes (logical divisions of the network) and hierarchical relationships therebetween, thus forming a scope hierarchy. The scopes include device scopes, which each correspond to an individual networking device within the network, as well as higher order scopes which correspond to groupings of networking devices. In the scope hierarchy, scopes can be subordinate to or superordinate to other scopes. In particular, each networking device scope is subordinate to (belongs to) at least one higher order scope, and each higher order scope is superordinate to (includes) one or more of the device scopes and/or one or more other scopes.

In some examples, some of the higher order scopes may be geographically defined scopes, meaning that these scopes correspond to certain geographical divisions, such as regions, sites, buildings, etc., or groupings thereof. Moreover, the hierarchical relationships between the networking device scopes and the geographically defined scopes may depend on the locational relationships between the networking devices and the corresponding geographical divisions. For example, suppose that a hypothetical university has multiple campuses (e.g., a main campus, a satellite campus, etc.) and various buildings located within each of the campuses, then the scopes defined for a network of the university could include campus scopes corresponding to the campuses, building scopes corresponding to the buildings, and device scopes corresponding to the individual networking devices, with the campus scopes and building scopes being examples of geographically defined scopes. Moreover, in a scope hierarchy for this hypothetical university network, a building scope may be superordinate to (include) the networking device scopes for all the networking devices physically located within the corresponds building, and a campus scope may be superordinate to (include) the building scopes for all the buildings physically located within the corresponding campus.

In some examples, in addition to or in lieu of geographically defined scopes, some of the higher order scopes may be defined based on non-geographical membership criteria. A networking device scope may be subordinate to (belong to) a given non-geographical higher order scope if the corresponding networking device satisfies the membership criteria of the given scope. The non-geographical membership may include, for example, a device type (e.g., indoor APs, outdoor Aps, fabric switches, etc.), a use case (e.g., "math department"), an arbitrary user-defined grouping, or any other grouping.

The configuration system may also comprise an object-to-scope mapper. The object-to-scope mapper allows a user to selectively map configuration objects in the configuration library to scopes in the scope hierarchy. When a given configuration object is mapped to a given scope, the properties or other settings contained in the given configuration object are automatically applied by the system to each networking device which belongs to the scope (unless an exception applies), wherein a networking device "belongs to" a given scope if the device scope corresponding to that networking device is subordinate to the given scope. For instance, supposes an administrator for the hypothetical university network mentioned above has defined a scope hierarchy comprising a "Main Campus" campus scope which is superordinate to (includes) an "Anderson Hall" building scope and a "Library" building scop. Suppose that the administrator has also defined configuration objects 1 and 2 in the configuration library. Finally, suppose that the administrator has mapped the configuration object 1 to the "Main Campus" scope and mapped the configuration object 2 to "Anderson Hall" scope. In response to these mappings, the configuration system will: (a) automatically apply the configuration properties of configuration object 1 to all networking devices belonging to the Main Campus scope, which includes all the networking devices located in Anderson Hall and all the networking devices located in the Library (because the Main Campus scope includes Anderson Hall and Library scopes), and (b) automatically apply the configuration properties of configuration object 2 to all networking devices belonging to the Anderson Hall scope, i.e., all networking devices physically located in Anderson Hall. Thus, in this hypothetical, the networking devices in Anderson Hall receive the configurations of both configuration objects 1 and 2 while the networking devices in the Library receive just the configuration of configuration object 1.

Thus, if a given configuration needs to be applied to multiple networking devices, the administrator may only need to enter the configuration paramters for the given configuration just once—i.e., when defining the configuration object—and then this same configuration can be automatically applied by the system to all the desired networking devices according to the defined mappings of the configuration object to scopes. Moreover, if the given configuration ever needs to be changed, this can be done by editing the existing configuration object or defining a new configuration object and new mapping, which allows the changes to be applied to all the appropriate networking devices without the administrator having to manually enter the changes in each such device. Furthermore, if it is desired to change which networking devices receive the given configuration, the administrator can easily do so by changing the mappings, without necessarily having to enter any configuration information again. For example, the given configuration could be extended to additional devices by adding a new mapping, or the given configuration could be removed from previously configured devices by removing a previously defined mapping. In this manner, the configuration system allows the administrator to easily configure and reconfigure multiple networking devices across a large network without having to repeatedly enter configuration information into multiple devices. In addition, the configuration objects, scopes, and mappings therebetween provide a convenient snapshot or summary of how the network and its subdivisions have been configured, which may alleviate the need for the user to manually keep track of which devices have been configured in which way and also may allow the user to more easily visualize how the network as a whole has been configured.

An alternative approach to configuring the networking devices is to use a configuration-node hierarchy. In the configuration-node hierarchy approach, "configuration nodes" are arranged in a hierarchy and the networking devices of the network are assigned to the lowest level configuration nodes. The configuration nodes are logical constructs which can be configured (receive configurations) as if they were networking devices, although they are not actually networking devices. When a configuration node is configured, the configuration of that node is automatically passed down to all subordinate networking devices. In this manner, multiple devices can be automatically configured in response a single entry of configuration information into a configuration node, thus reducing the number of times that an administrator has to manually enter the same configuration information.

However, while the configuration node hierarchy approach can reduce the number of times the administrator has to enter the configuration information in some circumstances, it may not provide the administrator with the same level of flexibility and control as is afforded by examples disclosed herein, and there are certain instances in which the configuration node hierarchy approach may still require the administrator to repeatedly enter the same configuration information multiple times. For instance, suppose that a given configuration node hierarchy has a configuration node A with four subordinate configuration nodes B, C, D, and E (each with various subordinate networking devices). Suppose further that the administrator wishes to apply a given configuration to the network devices of just configuration nodes B, C, and D and does not want the configuration to be applied to the network devices of configuration node E. In these circumstances, the administrator would have to enter the same configuration information three separate times into each of configuration nodes B, C, and D. Note that the administrator could not instead enter the configuration information just once into configuration node A, because doing this would cause the configuration to be applied to all of its subordinate nodes including node E, contrary to the administrator's desire to exclude the configuration from the devices node E. This scenario illustrates the more general issue that, using the configuration node hierarchy approach, if one desires to apply a configuration to less than all of the configuration nodes belonging to the same superordinate configuration node, then the configuration will have to be manually entered individually into each of the desired configuration nodes, resulting in repetitive entering of the same configuration information multiple times.

In contrast, using examples disclosed herein, the administrator could achieve the desired outcome (applying the given configuration to the devices of B, C, and D but not those of E) while only entering configuration information a single time. For instance, suppose an example configuration system disclosed herein is used and that scopes A, B, C, D, and E are defined in a scope hierarchy therein, with scopes B, C, D, and E being subordinate to scope A. The administrator could define a single configuration object for the given configuration in the configuration library and then map the configuration object to each of the scopes B, C, and D. The result of this would be that the given configuration is applied to the devices of the scopes B, C, and D (because the object was mapped the B, C, and D) but not to the devices of scope E (because the object was not mapped to scope E). Thus, the desired outcome is achieved and yet the administrator only had to enter the configuration information once, namely when the administrator defined the configuration object.

Another issue with the configuration-node approach may arise when trying to make changes to a configuration after it has been applied to multiple configuration nodes. To update a given configuration, the administrator may have to enter changed configuration information into whichever configuration nodes had previously received the given configuration. If multiple nodes had originally received the configuration, updating the configuration may require the administrator to remember which configuration nodes originally received the configuration and then, assuming success in remembering the nodes, repetitively enter the updated configuration information into each of those nodes. For instance, continuing the scenario from above, to change the given configuration which was applied to nodes B, C, and D, the administrator would first have to remember that it is nodes B, C, and D which originally received the given configuration and then enter the same updated configuration information seperately into each of the nodes B, C, and D.

In contrast, using examples disclosed herein, changing an aspect of a previously applied configuration can be done easily with the administrator only having to enter the changed configuration information once. For example, in some cases the administrator can edit the already existing configuration object in the configuration object library, and the changes will be propagated to the networking devices according to the previously established mappings. Or, in other cases, the administrator may define a new configuration object in the library which has the desired changes, remove the previously established mappings of the old object to the scopes, and then add new mappings from the new object to the scopes. In either case, the change in configuration is effectuated with the administrator entering the updated configuration information just once.

Another thing which is more difficult when using the configuration-node approach is changing which network devices a previously established configuration is applied to. This may require the administrator to manually configure configuration nodes, such as by entering the configuration information again into one or more new configuration nodes (to add the configuration to additional devices) or manually removing the configuration information from a previously configured configuration node (to remove the configuration from some devices).

In contrast, changing which network devices a previously applied configuration is applied to can be relatively easy using the example systems disclosed herein, and in some cases may not require the administrator to do any configuring (i.e., without entering configuration information or removing previously entered configuration information). Specifically, in some examples the administrator can change which devices receive the configuration by simply changing the object-to-scope mappings, such as by adding a new mapping (to extend the configuration to additional devices) or removing an existing mapping (to remove the configuration from some devices).

Another potential issue with the configuration-node approach is that, in this approach, a configuration is defined only insofar as it has been applied to a node (and hence, to networking devices belonging to the node), meaning that there is no way to separate the definition of the configuration from the application of the configuration. This can make it more difficult to develop and test a new configuration or experiment with changes to an existing configuration. When developing new configurations or changing an existing configuration, one may desire to have the configuration not be applied to the network until the configuration has been deemed ready, as the in-progress configuration is likely to have issues that could negatively affect the network. However, because definition and application of the configuration are tied together in the configuration-node approach, as the administrator works on a new configuration it gets rolled out to the devices in the network with each iteration. There may be ways to mitigate this problem, such as creating a separate test configuration node which is isolated from the network, but this can make the configuration development process more complicated. In addition, once the configuration is ultimately deemed ready to use, the administrator may have to manually enter the configuration information into each of the real configuration nodes to apply the configuration to the actual target devices, and this manual re-entry of the configuration information is not only time consuming and annoying, it is also a potential source for error.

In contrast, in examples disclosed herein, the configuration objects can be defined and exist in the configuration library seperately from their application to networking devices. In other words, an administrator can fully define a configuration without that configuration being automatically applied to any network devices. This may be useful, for example, when the configuration is under development and the administrator is not yet ready to roll it out to the devices in the network. For example, the administrator can develop the configuration by editing the configuration object in the configuration library prior to mapping the object to any scopes. Because the object is not mapped to any scopes, any bugs or other problems arising during the development/testing will not be applied to or negatively affect any of the networking devices. Moreover, if the administrator desires to test a configuration object on some devices without rolling it out to all the target devices, they can do so by simply mapping the configuration object to a scope which contains the desired test devices. When the configuration object is deemed ready roll out to the network, the administrator can simply map the configuration object to the appropriate scopes, without having to re-enter the configuration information.

These and other aspects of examples disclosed herein will be described in greater detail below in relation to FIGS. 1-15.

FIG. 1 illustrates an example networking device configuration system 100 (system 100). The networking device configuration system 100 can be used to configure networking devices of a network, and thus the system 100 is illustrated in FIG. 1 and described below in conjunction with an example network 190 to facilitate understanding. Some examples disclosed herein may comprise a system 180 which comprises both the system 100 and the network 190. However, the system 100 can also be provided (e.g., made, used, etc.) seperately from a network, and some examples disclosed herein may comprise the system 100 alone. The network 190 is merely one non-limiting example of a network with which networking device configuration system 100 can be used, and the networking device configuration system 100 can be used with other networks having different numbers, types, and/or arrangements of networking devices. FIG. 1 is schematic in nature and is not intended to illustrate shapes, sizes, or other structural details accurately or to scale. Some examples of the system 100 may include components which are not illustrated in FIG. 1, and one or more components illustrated in FIG. 1 may be omitted from the system 100 in some examples.

The networking device configuration system 100 may comprise, be, or be part of, an information processing device, such as a computer (e.g., server), networking device, or other device capable of processing information. In some examples, the system 100 may be provided in a device which is part of the network which the system 100 is used to configure. In other examples, the system 100 may be provided in a device which is physically and logically outside of the network, with the system 100 being communicably connected to the network via the internet and/or other intermediate communication channels. For example, the system 100 may be provided in: one of the networking devices of the network (e.g., one of the networking devices 191 of network 190); in a network controller, server, or other computer connected to one of the networking devices; in a private cloud computing platform (e.g., one owned by the same entity which owns the network); in a public cloud computing platform (e.g., one owned by a different entity than the owner of the network); or in some other information processing device.

As shown in FIG. 1, the system 100 comprises networking device configuration logic 101 ("logic 101"). The network device configuration logic 101 is configured to cause the system 100 to perform operations associated with network device configuration as described herein. These operations may include operations associated with instantiating and running a configuration library 110, a scope hierarchy manager 120, an object/scope mapper 130, and a configuration applying unit 140, all of which will be described in greater detail below. As used herein, "logic" refers to (a) software instructions stored in a data storage device and coupled with a processor capable of executing the instructions, (b) dedicated hardware (logic devices), or (c) some combination of (a) and (b). Thus, in some examples the networking device configuration logic 101 comprises a processor 102, a data storage device 103, and instructions 104 stored in the data storage device 103, with the instructions 104 being executable by the processor 102 to cause performance of some or all of the operations described herein. Furthermore, in some examples, the networking device configuration logic 101 comprises one or more logic device(s) 105 configured to perform some or all of the operations described herein, such as an Application Specific Integrated Circuit (ASIC), a Field Programmable Gate Array (FPGA), a Complex Programmable Logic Device (CPLD), discrete logic circuits, a hardware accelerator, etc. Moreover, in some examples, the networking device configuration logic 101 comprises a combination of both the logic device(s) 105 and the processor 102 with data storage device 103 and instructions 104, to perform the operations described herein.

The system 100 also comprises a communication interface 106. The communication interface 106 communicably connects the logic 101 to external devices, such as the network 190. For example, the communication interface 106 may comprise one or more communication ports (e.g., ethernet RJ45 ports, optical fiber transceiver ports, etc.) which can be connected via cables to the external device and one or more internal busses or other interfaces connected the logic 101 to enable communication between the logic 101 and the external device. Such communication interfaces 106 are well understood in the art and thus additional details thereof are omitted herein for the sake of brevity.

As noted above, the logic 101 is configured to instantiate and run a configuration library 110 when the system 100 is operational. The configuration library 110 is a logical entity (e.g., program, routine, etc.) configured to, when instantiated, receive and store definitions of configuration objects 112. Definitions of the configuration objects 112 may be received from a user and the configuration objects 112 may be stored in a storage device such as data storage device 103. Each configuration object 112 may include a set of configuration properties which are specified by the user as part of defining the object 112 and which together may constitute a configuration which may be applied to a networking device. For example, configuration objects 112 could be defined for configurations such as: VLANS, interfaces, tunnels, WLANs, SSIDs, routing information, security policies, network bandwidth, Quality of Service (QoS), or any other configurations which can made to networking devices. At least some of the configuration objects 112 may be sharable, meaning that they can be applied to multiple networking devices (via mapping to scopes, as described below) but without there being separate instances of the configuration for each device—instead, there is one shared instance of the configuration object 112 regardless of how many devices the configuration is applied to.

Figures 2, 3:
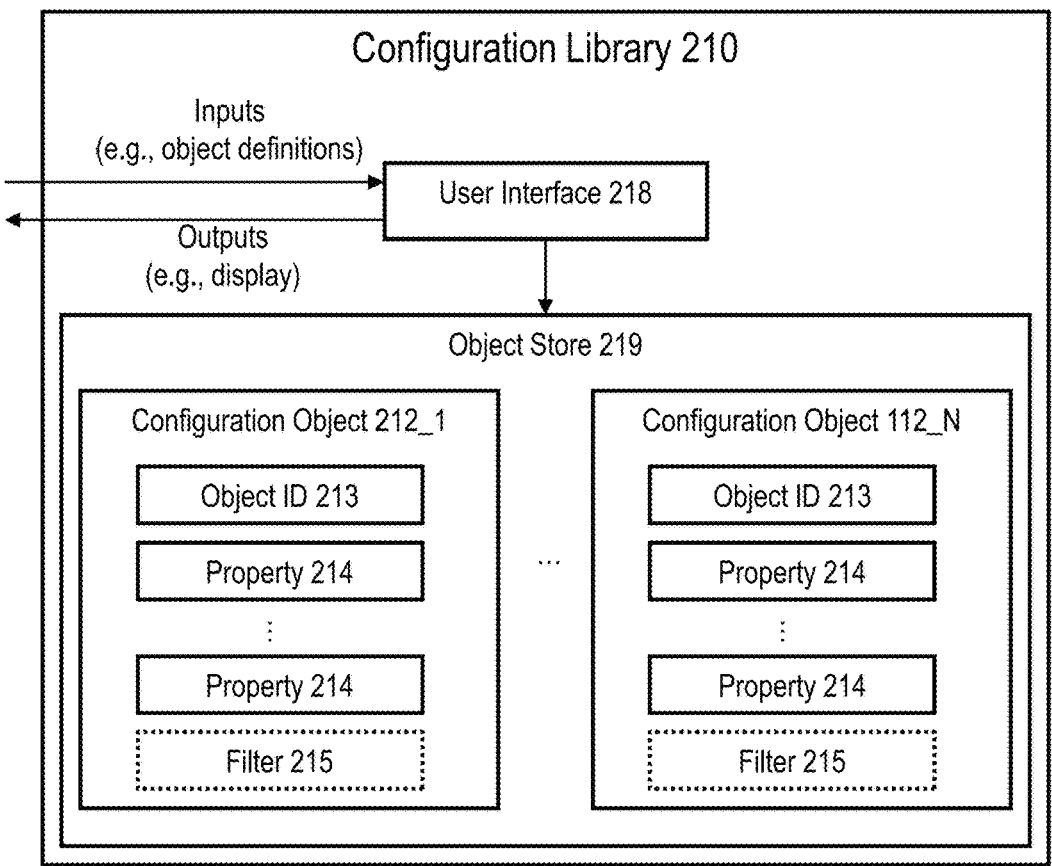
FIG. 2 is a block diagram illustrating an example configuration library of a networking device configuration system.
FIG. 3 is a block diagram illustrating another example configuration library of a networking device configuration system.

Turning to FIG. 2, an example configuration library 210 is illustrated which is one example implementation of the configuration library 110. The configuration library 210 comprises an object store 219 to store configuration objects 212. The configuration objects 212 are example implementations of the configuration objects 112 of FIG. 1. The object store 219 may be a database which is configured to store data structures corresponding to the configuration objects 212, as described below. Any number of configuration objects 212 may be stored in the object store 219 (subject to the limitations of the hardware), with FIG. 2 illustrating configuration objects 212_1 to 212_N as one example (N being any integer equal to or greater than 2). Each configuration object 212 is a data structure (e.g., table) which comprises one or more configuration properties 214 specified by a user. The configuration object 212 may also comprise additional data, such as an object ID 213 to identify the object, and in some examples a filter 215 (described in more detail below). In FIG. 2, multiple properties 214 are illustrated per object 212, but in some cases an object 212 could have just one property 214. A configuration property 214 may include a setting or value specified for a particular parameter or property associated with a configuration. For example, to configure an SSID may entail specifying an SSID name, a password, etc., and therefore a configuration object 212 defined for an SSID configuration may include one property 214 specifying an SSID name, one property 214 specifying a password, etc.

In some examples, the configuration library 210 may be configured with certain predefined information or data structures which may aid the user in defining configuration objects. For example, the configuration library 210 may be configured to allow a user to select a configuration type from among a group of predefined configuration types when defining a new configuration object 212, and the structure of the configuration object 212 may be defined accordingly. For example, different types of configurations may have different numbers and types of properties, and hence configuration objects 212 associated with different configurations may have different numbers and types of properties 214. In some examples, the configuration library 210 may present the user with fields or other prompts in which the user may enter such properties 214, with the number and/or types of fields or prompts depending on the type of configuration selected by the user. In other words, the library 210 may include different templates associated with different types of configurations, which may be used by the user to define a configuration object 212. For example, if a user were to select an SSID configuration type when creating a given configuration object 212_1, then the configuration library 210 may use a predefined template for SSID configurations to create a configuration object 212_1 which has the appropriate properties 214, such as an SSID name property 214, a password property 214, etc., and the configuration library 210 may provide different editable fields and/or prompts for these properties 214 to allow the user to enter the specific configuration information therein. If instead the user selected a different type of configuration, the configuration library 210 may use a different template to create the configuration object 212 and it may have other types of properties 214 which are associated with that configuration. In this manner, different configuration objects 212 may have different numbers and types of configuration properties 214 in accordance with the different types of configurations that the objects 212 are associated with. In some examples, the configuration library 210 may also include default values for some or all properties 214 of some or all configuration objects 212, and a user may change the values of the properties 214 away from the default values if desired or may adopt the default values if desired. In some examples, the default values for a type of configuration can be specified by the user, so that future configuration objects 212 of that type begin with the specified default values. Note that multiple different configuration objects could be defined for the same type of configuration, in which case they would have the same types of configuration properties 214 but different values for those configuration properties 214. The types of configurations which can be made to networking devices, and the properties associated with such configurations, are well understood in the art, and thus are not listed exhaustively herein.

In some examples, instead of or in addition to the configuration library 210 structuring the objects 212 based upon a user-selected type of configuration, the configuration library 210 may allow a user to define the configuration object 212 in a free-form manner by adding properties 214 ad hoc without the configuration library 210 imposing a predetermined structure.

The configuration library 210 also comprises a user interface 218 which allows the user to make inputs to the configuration library 210. The user interface 218 may also provide outputs back to the user, such as display information which can be displayed by a display device. The user interface 218 may include a graphical user interface (GUI), a command line interface (CLI) or other text-based interface, an application programming interface (API), and/or any other type of user interface which can allow for user input and/or output. The inputs which the user may input into the configuration library 210 via the interface 218 may include an input to add a new configuration object 212, an input to edit an existing configuration object 212, an input to delete an existing configuration object 212, an input to view information about a configuration object 212, or other types of inputs. Adding a new configuration object 212 and editing an existing configuration object 212 may both be referred to herein as defining the configuration object 212, and each may comprise the user specifying a value for one or more of the configuration properties 214 associated with the configuration object 212. The outputs which the user interface 218 may provide to the user may include, for example, text and/or graphics representing the configuration objects 212 currently extant in the configuration library 210 and the data associated therewith (such as the properties 214 thereof). The outputs may also include, for example, prompts to aid the user in defining the configuration objects, such as a display of fillable fields corresponding to certain properties 214 into which the user may enter values, with the fields being structured according to a type of configuration as described above. The user interface 218 may also include menus or other selectable items (e.g., buttons, toggles, etc.) to enable the user to interact with the configuration library 210.

As previously mentioned, generally the configuration objects 112 and 212 are sharable objects, meaning that they can be mapped to any number of scopes 122 (which will be described below) and the configurations thereof can be applied to any networking devices belonging to those scopes 122. However, in some examples, it may be desired to allow for some configuration objects to be restricted to certain devices or scopes without allowing sharing of the objects to all other devices or scopes. These restricted configuration objects may still be sharable among multiple devices or scopes, but are not globally sharable. FIG. 3 illustrates one example configuration library 310 which can provide for this. The configuration library 310 is an example implementation of the configuration library 110. The configuration library 310 comprises an object store 319 which is similar to the object store 219 and which stores configuration objects 312 which are similar to the configuration objects 212. (The configuration library 310 may also have a user interface (not illustrated) similar to the user interface 218). The configuration library 310 is configured to allow for the definition of multiple namespaces including one or more shared namespace 315 and one or more local namespaces 316. The namespaces 315 and 316 are logical divisions of the object store 319 in which configuration objects 312 may be stored. Objects stored in a shared namespace 315, such as the configuration object 312_1 illustrated in FIG. 3, are globally shareable meaning that they can be mapped to any and all scopes 122 in the scope hierarchy 121. In contrast, objects 312 stored in a local namespace 316, such as the configuration object 312_2 illustrated in FIG. 3, may be mappable to only a subset of the scopes 122 which is associated with the namespace 316. For instance, in some examples, a local namespace 316 may correspond to a particular scope 122 and the objects 312 stored in that namespace 316 may be mapped only to that scope or to scopes subordinate thereto. The local namespaces 316 may allow for scope-specific configurations which are not necessarily applicable to other scopes. Moreover, in some examples, different access permissions may be used for different namespaces, which may allow an administrator to restrict who can define configuration objects 312 in certain namespaces and/or who can map the objects 312 contained in those namespaces. This may be useful in some large networks which may have multiple administrators which may be distributed geographically, where it may be desired to allow local administrators to define configurations for scopes under their jurisdiction but it may not be desired to have the local administrators defining network wide configurations. In such a case, for example, a global network administrator may be given access to the shared namespace 315 in which they can define configuration objects 312 which can be mapped to any scopes in the network, while more local administrators may be given access to corresponding local namespaces 316 in which they can define configuration object 312 which they can mapped to only local scopes.

Returning to FIG. 1, the logic 101 is configured to instantiate and run a scope hierarchy manager 120. The scope hierarchy manager 120 is a logical entity (e.g., program, routine, etc.) configured to, when instantiated, store one or more scope hierarchies 121, with each scope hierarchy 121 corresponding to a network which the system 100 is to configure. More than one scope hierarchy 121 may be managed by the scope hierarchy manager 120, but for ease of understanding it will be assumed in the description below that there is a single scope hierarchy 121.

More specifically, the scope hierarchy manager 120 may be configured to receive and store definitions of scopes 122 and hierarchical relationships 123 between the scopes 122, and these scopes 122 and their relationships 123 form a scope hierarchy 121. Each scope 122 represents a logical subdivision of the network to which the scope hierarchy 121 corresponds, such as the network 190 in the example of FIG. 1, with each subdivision comprising a subset of the network devices thereof. The scopes 122 are arranged hierarchically, with some scopes 122 "belonging" (i.e., being subordinate to) other scopes 122.

Ultimately, at the bottom of each hierarchical chain in the hierarchy 121 are device scopes 127, which correspond to and represent individual networking devices 191 (e.g., each networking device 191 in the network 190 may have its own corresponding device scope 127 in the hierarchy 121). Thus, in some contexts, the device scopes 127 may be referred to as simply "devices 127." In some examples, the devices scopes 127 may be automatically defined as a default by the scope hierarchy manager 120 based on information about the network 190.

Farther up each hierarchical chain are higher-order scopes (e.g., scopes 124, 125, and 126) to which the device scopes 127 are directly or indirectly subordinate. The higher-order scopes may have as their subordinates other higher-order scopes and/or device scopes 127. A networking device 191 "belongs" to a given scope 122 if the device scope 127 which corresponds to the networking is subordinate (directly or indirectly) to the given scope 122. Note that the reference number 122 may be used herein when referring generically to a scope 122 without specifying its hierarchical position in the scope hierarchy 121, but when it is desired to specify the hierarchical position of the scope 122 then other reference numbers such as 124, 125, 126, or 127 will be used.

For example, as shown in FIG. 1, one of the higher order scopes 122 may be a global scope 124 to which all other scopes 122 are subordinate. This global scope 124 represents the entire network 190 and all network devices 191 thereof belong (indirectly) to this global scope 124. In some examples, the global scope 124 may be automatically defined as a default by the scope hierarchy manager 120.

Moreover, directly subordinate to the global scope 124 are one or more Tier 1 scopes 125, which are another type of higher order scope 122. Each Teir 1 scope 125 is directly related to (subordinate to) the global scope 124 via a hierarchical relationship 123.

Directly subordinate to each Tier 1 scope 125 may be a corresponding set of Teir 2 scopes 126, which are another type of higher order scope. Each Teir 2 scope is directly related to (subordinate to) a corresponding Teir 1 scope 125 via a relationship 123, and may be said to "belong" to that Teir 1 scope 125. Each Teir 2 scope 126 belongs indirectly to the global scope 124, via the corresponding Teir 1 scope 125 to which the Teir 2 scope 126 is directly subordinate.

In FIG. 1, only one Teir 1 scope 125, one Teir 2 scope 126, and one device 127 are illustrated, but any number of each of these scopes 122 may be present. Furthermore, additional tiers of scopes 122 may also be present, with the scopes 122 in each successive tier being directly subordinate to a corresponding scope 122 in the previous tier. In FIG. 1, the device scope 127 is shown being directly subordinate to a Teir 2 scope 126, but this is merely one possibility illustrated for convenience, and in practice device scopes 127 could be directly subordinate to any other scope 122 in any tier. Moreover, the device scopes 127 are not necessarily all directly subordinate to the same tier of scope 122 as one another, e.g., some devices 127 may be subordinate directly to a Teir 1 scope 125 while other devices 127 are directly subordinate to a Teir 2 scope 126. The number of higher order scopes 122 or device scopes 127 that can be subordinate to any given scope 122 is not limited.

In some examples, at least some of the scopes 122 may be defined geographically, meaning that such scopes correspond to a geographical division (e.g., region, site, building, etc.) and include all of the network devices which are in located in that geographical division. In some cases, one geographically defined scope 122 may be subordinate to another, which may imply that the geographical division of the superordinate scope 122 includes the geographical division of the subordinate scopes 122. The geographical division which includes the others may physically encompass the other geographical divisions or may be an arbitrary grouping of the other geographical divisions. In some examples, at least some of the scopes 122 may be defined non-geographically, for example based on user-defined or other logical groupings of networking devices. In some examples, both geographically defined and non-geographically defines scopes may be defined. Examples of geographically defined and non-geographically defined scopes 122 will be described in greater detail below in relation to FIG. 4.

In some examples, definitions of the scopes 122 and hierarchical relationships 123 may be received by the scope hierarchy manager 120 from a user. In some examples, some scopes 122 and/or relationships 123 may be predefined as defaults. For example, in some cases a global scope 124 may be defined by default. As another example, in some cases certain logical scopes 122 based on commonly used device types (e.g., access switch, gateway, wireless access point, etc.) may be programmed into the scope hierarchy manage 120 by default. In some examples, some scopes 122 and/or relationships 123 may be deduced by the scope hierarchy manager 120, for example based on information received about the network 190. For example, in some cases the scope hierarchy manager 120 may receive information from the network 190 identifying all of the networking devices 191 therein and the scope hierarchy manager 120 may create devices 127 in the scope hierarchy based on this information. As another example, in some cases the network 190 may provide to the scope hierarchy manager 120 identifiers of geographical divisions of the network 190 and the scope hierarchy manager 120 may generate geographically based scopes 122 based on this information. The scopes 122 and their relationships 123, however defined, may be stored in a storage device such as data storage device 103. For example, the scopes 122 may be stored as tables, with the table of a given scope 122 including data specifying the other scopes 122 or devices 127 which are directly subordinate thereto and also data specifying the scope 122 (if any) to which the given scope 122 is directly subordinate.

Figure 4:
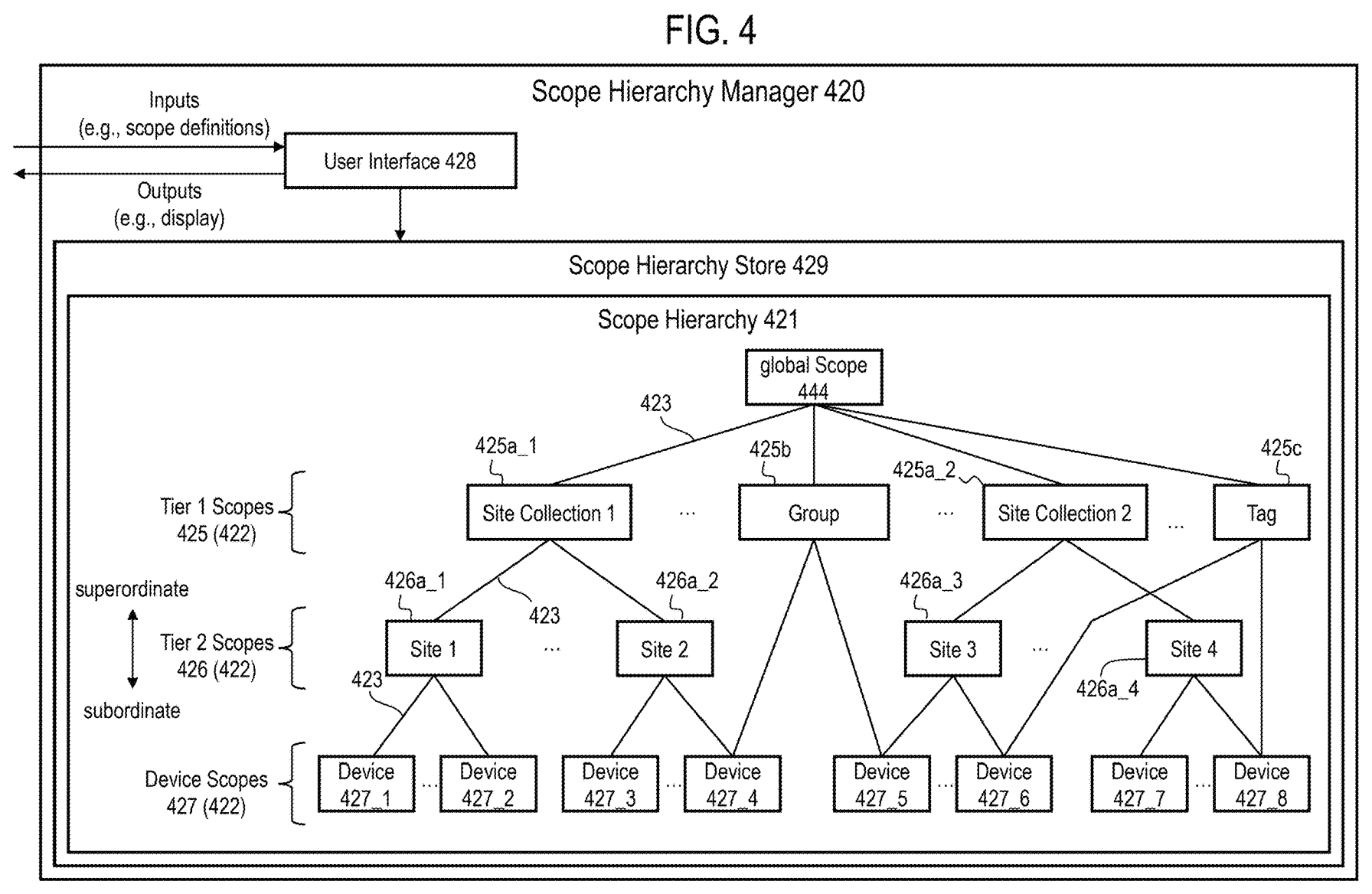

Turning to FIG. 4, an example scope hierarchy manager 420 is illustrated which is one example implementation of the scope hierarchy manager 120. The scope hierarchy manager 420 comprises a scope hierarchy store 429 to store one or more scope hierarchies 421. The scope hierarchies 421 are example implementations of the scope hierarchies 121 of FIG. 1. Any number of scope hierarchies 421 may be stored in the scope hierarchy store 429 subject to the limitations of the hardware). Each scope hierarchy 421 comprises data structures (e.g., tables) specifying multiple scopes 422 and hierarchical relationships 423 therebetween.

FIG. 4 illustrates one example of a scope hierarchy 421 which is used for illustrative purposes herein, although any other type of scope hierarchy 421 could be stored in the scope hierarchy store 429. The scope hierarchy 421 in FIG. 4 corresponds to the network 190 in FIG. 1 and includes one example of how scopes 422 could be defined hierarchically for this example network 190.

In the example scope hierarchy 421, there is a global scope 444 to which all other scopes 422 and devices 427 are subordinate. This global scope 444 corresponds to the entire network 190 and all networking devices 191 belong (indirectly) to the global scope 444.

The example scope hierarchy 421 also comprises a number of geographically defined scopes. These geographically defined scopes include both Teir 1 scopes 425 (i.e., site collection scopes 425*a*) and Teir 2 scopes 426 (i.e., site scopes 426*a*). The geographically defined scopes correspond to geographical divisions in which the networking devices are deployed, and each such scope may include (i.e., be superordinate to) each of the networking devices physically located within the corresponding geographical division. Specifically, the example network 190 from FIG. 1 includes networking devices 191 which are deployed in various geographical divisions including at least the regions 193_1 and 193_2. The regions may be relatively larger geographical divisions, such as countries, states, etc. The regions each include various sites, with the sites being relatively smaller geographical divisions such as a city, a campus, an office complex, etc. Specifically, the region 193_1 contains at least the sites 192_1 and 192_2, while the region 193_2 contains at least the sites 192_3 and 192_4. Given this deployment of the network 190, the scope hierarchy 421 corresponding to the network 190 may include some geographically defined scopes corresponding to the regions 193 and other scopes corresponding to the sites 192.

More specifically, the Teir 1 scopes 425 of the scope hierarchy 421 may include site collection scopes 425*a* which correspond to the various regions 193, including site collection scopes 425*a*_1 and 425*a*_2 which correspond to the regions 193_1 and 193_2, respectively. In general, a "site collection" scope corresponds to a "region," wherein a region is a geographical division comprising multiple sites (geographical locations). The "region" can be a contiguous geographical region (e.g., a state, country, etc.) which physically encompasses the multiple sites or it can be an arbitrary grouping of the multiple sites.

Moreover, the Teir 2 scopes 426 of the scope hierarchy 421 may include site scopes 426*a* which correspond to the sites 192, specifically site scopes 426*a*_1 through 426*a*_4 which correspond to sites 192_1 to 192_4, respectively. In general, a "site" scope corresponds to a geographical location which is smaller (logically and/or physically) than a region, such as a campus, an office complex, a datacenter, a neighborhood or district, a city, etc. Note that the relative sizes of sites and regions may vary from one scope hierarchy to the next, depending on the nature of the network to which the scope hierarchy corresponds. For example, in a network which spans multiple countries, the regions to which the site collections 425*a* correspond may include countries while the sites to which the sites 426*a* corresponding may include states or cities within the countries, whereas in a different network which is contained entirely with a given city, the regions to which the site collections 425*a* correspond may include neighborhoods/districts within the city with the sites to which the sites 426*a* corresponding may include branches or buildings within the city. As another example, in a network which has multiple campuses, a site 426*a* may correspond to an individual campus and a site collection 425*a* may correspond to a grouping of campuses, whereas in a network which has a single campus, a site 426*a* may correspond to a given building within the campus and a site collection 425*a* may correspond to a grouping of these buildings.

More specifically, the Teir 1 scopes 425 of the scope hierarchy 421 may include site collection scopes 425*a* which correspond to the various regions 193, including site collection scopes 425*a*_1 and 425*a*_2 which correspond to regions 193_1 and 193_2, respectively. Moreover, the Teir 2 scopes 426 of the scope hierarchy 421 may include site scopes 426*a* which correspond to the sites 192, specifically site scopes 426a_1 through 426a_4 which correspond to sites 192_1 to 192_4, respectively.

The scope hierarchy 421 also comprises device scopes 427 ("devices 427") for each of the networking devices of the network, which each device scope 427 being directly subordinate to the site scope 426a which corresponds to the site in which the corresponding networking device is deployed. For example, device 427_1 and 427_2 (among others, not illustrated) correspond to the networking devices 191 deployed at the site 192_1 and therefore the devices 427_1 and 427_2 are directly subordinate to the site scope 426a_1 which corresponds to site 192_1. Similarly, devices 427_3 and 427_4 (among others, not illustrated) correspond to the networking devices 191 deployed at the site 192_2, and therefore the devices 427_3 and 427_4 are directly subordinate to the site scope 426a_2 which corresponds to site 192_2. Similarly, devices 427_5 and 427_6 (among others, not illustrated) correspond to the networking devices 191 deployed at the site 192_3, and therefore the devices 427_5 and 427_6 are directly subordinate to the site scope 426a_3 which corresponds to the site 192_3. Finally, devices 427_7 and 427_8 (among others) correspond to networking devices 191 deployed at the site 192_4, and therefore the devices 427_7 and 427_8 are directly subordinate to the site scope 426a_4 which corresponds to the site 192_4.

Note that, in some examples, each site scope 426 includes all of the devices 427 directly subordinate thereto but does not include other devices 427 which are subordinate to some other site scope 426. Moreover, in some examples, a device 427 can belong to just one site scope 426. Also, in some examples, a site collection 425a includes all of the site scopes 426 subordinate thereto and all of the devices 427 which are subordinate to one of those site scopes 426, but does not include site scopes 426 (or their subordinate devices 427) which are subordinate to some other site collection 425a. Moreover, in some examples, a site 426a can belong to just one site collection 425a. Thus, in the example hierarchy 421, site collection 425a_1 includes the site scopes 426a_1 and 426a_2 and their subordinate devices 427_1 to 427_4, whereas site collection 425a_2 includes the site scopes 426a_3 and 426a_4 their subordinate devices 427_5 to 427_8.

In some examples, the scope hierarchy manager 420 may be configured to automatically determine a set of geographically defined scopes 422 and assign devices 427 thereto based on received information about the geographical distribution of devices in the network 190. For example, the scope hierarchy manager 420 may be configured to receive identifying information from the network 190 which may specify, among other things, geographical divisions thereof and the locations of the networking devices 191 relative to those geographical divisions. As another examples, the user may manually provide information to the scope hierarchy manager 420 (via user interface 428, described below) specifying geographical divisions of the network. Based on the identifying information (whether received from the network 190 or from the user), the scope hierarchy manager 420 may be configured to automatically create geographical scopes (such as site scopes 426a, site collection scopes 425a, etc.) corresponding to the geographical divisions. In some of these examples, the scope hierarchy manager 420 may be pre-programmed with templates for certain pre-specified types of geographic defined scopes (such as site collection scopes 425a and site scopes 426a) and may automatically assign different types of scopes to different geographical divisions based on the identifying information.

For example, if the identifying information specifies two hierarchic tiers of geographic divisions, the manager 420 may automatically assign a scope having the site collection scope 425a type to each of the higher tier geographic divisions and a scope having the site scope 426a type to each of the lower tier geographic divisions. Thus, in examples in which the manager 420 automatically determines the geographic scopes, the user might not necessarily explicitly define the geographic scopes, but may nevertheless be regarded as defining the scopes indirectly by virtue of causing (or allowing) the identifying information to be provided the scope hierarchy manager 420.

In some examples, each geographic scope includes not only a specified type (e.g., site scope, site collection scope, etc.) but also a unique name. In some examples, the scope hierarchy manager 420 may automatically generate the names of each scope, in addition to determining the types. In some examples, generic names may be given by the scope hierarchy manager 420 to the scopes when the manager 420 lacks information from which more specific information names could be determined, such as the generic names shown in FIG. 4 (e.g., "site 1," "site collection 2," etc.). In some examples, when there is more specific information provided to the manager 420, it may assign more specific names to each scope, such as names which identify the geographical divisions corresponding to the scope (e.g., "Dallas campus," "Austin campus"). In some examples, the scope hierarchy manager 420 may be configured to allow a user to name or rename the scopes, in addition to or in lieu of automatically providing names.

In some examples, the scope hierarchy manager 420 may be configured to allow a user to explicitly define a geographic scope (via user interface 428, described below). This capability for users to provide explicit definitions may be provided in addition to the capability of the manager 420 to automatically define geographic scopes in some examples, or in lieu of the capability of the manager 420 to automatically define geographic scopes in other examples. For example, the manager 420 may allow the user to explicitly define the scope 422 by, among other things, specifying hierarchical relationships to other scopes 422/devices 427.

This ability to explicitly define scopes may be useful, for example, in cases where the user would like to define additional levels of geographical scopes beyond those implicit in the geographical information provided by the network 190. For example, suppose that the network 190 identifies sites associated with each networking devices 191 but does not include any other information which would identify other types of geographical divisions. In such a case, the system may automatically generate site scopes 426a and assign devices 427 thereto based on the identifying information, but it will not necessarily be able to automatically generate site-collection 425a scopes or other geographical scopes without further information. In such a scenario, the user could, in some examples, manually define a given site collection scope 425a by instructing the manager 420 to add a new scope and specifying a subset of the site scopes 426a to be included in (subordinate to) given site collection scope 425a. In some examples, the user may specify a type for the new scope (e.g., "site collection" type in the previously mentioned example) and/or a name therefore, whereas in other examples the manager 420 may infer the type of the scope based on the hierarchical relationships specified by the user.

In other scenarios, the system might not automatically define any geographical scopes at all, and the user may therefore need to manually define each geographical scope.

For example, the user may manually define each site scope 426a (which includes assigning devices 427 to each site scope 426a) and then manually define site collection scopes 425a (which includes assigning site scopes 426a to each site collection scope 425a).

In some examples in which the user can explicitly define geographical scopes, the scope hierarchy manager 420 may store pre-specified types of geographical scopes (e.g., site collection, site, etc.) and the user may select from among these pre-specified scope types when defining a given scope 422. In other examples, in addition to or in lieu of the manager 420 including a pre-specified list of scope types, the user may arbitrarily specify a scope type. In some examples, after having selected or specified a type for the given scope, the user may complete the definition of the given scope by specifying devices 427 and/or other scopes 422 which are directly subordinate to the given scope and a scope directly superordinate to the given scope.

In addition to the geographically defined scopes mentioned above, the example scope hierarchy 421 of FIG. 4 also includes some non-geographically defined scopes 422. One of these is a group scope 425b, which in the example hierarchy 421 is a Teir 1 scope 425. In general, a "group" scope may be a scope which includes a user-defined subset of the devices. In some examples, the user can arbitrarily assign devices 427 to the group scope 425b. In some examples, the user can define one or more membership criteria and the scope hierarchy manager 420 then automatically assigns devices 427 to the group scope 425b based on whether the devices satisfy the membership criteria. In some examples, a membership criterion may reflect a use-case for the networking device. For example, if an organization which owns the network includes various logical subdivisions, a use-case based membership criterion may be that a given group scope will include any network devices which are allocated to (i.e., intended for use by) a corresponding logical subdivision. For example, in a network owned by a university, logical subdivisions thereof may include departments (e.g. math department, biology department, etc.) and in such an example various group scopes could be defined for the departments, respectively, with a membership criterion for a given group being that any devices allocated to a corresponding department are included in the given group.

In the example of FIG. 4, the devices 427_4 and 427_5 happen to belong to the group scope 425b. Note that the devices 427_4 and 427_5 also belong to other scopes, namely site scopes 426a_2 and 426a_3 (directly) and site collection scopes 425a_1 and 425a_2 (indirectly). This illustrates that, in general, a given device 427 can belong, directly and indirectly, to multiple other scopes 422 and, in particular, that membership in a group scope 425b does not exclude the possibility of membership in a geographically defined scope (such as a site scopes 425a) and vice versa. This also illustrates that devices 427 which belong to the same group scope 425b as one another do not necessarily have to belong to the same site scope 426a, or even the same site collection scope 425a, as one another (although they can).

In some examples, the scope hierarchy manager 420 may be configured to automatically generate group scopes 425b based on identifying information provided by the network 190. For example, in some implementations the network 190 may specify use-cases or other logical subdivisions for the networking devices 191, and based on this information the scope hierarchy manager 420 may automatically create a group scope for each specified use-case or other logical subdivision. In such examples, the group scopes 425b may still be considered "user defined" in the sense the user causes (or allows) the information which is used to generate the scopes 425b to be received by the manager 420.

In some examples, in addition to or in lieu of automatic definition by the manager 420 of group scopes 425b, the scope hierarchy manager 420 may be configured to allow the user to explicitly define group scopes 425b. For example, in some implementations the scope hierarchy manager 420 may allow the user to specify the membership criteria for a group scope 425b, and then the manager 420 may automatically determine and assign membership in the group scope 425b based on the membership criteria. As another, in some implementations the scope hierarchy manager 420 may allow the user to explicitly specify which devices 427 are to be members of a given group scope 425b without specifying any membership criteria.

Another non-geographically defined scope in the scope hierarchy 421 is the tag scope 425c. The tag scope 425c may be similar to the group scope 425b in that it may include a grouping of devices 427 wherein membership is determined based on one or more membership criteria. However, the tag scope 425c may differ from the group scope 425b in that it may have a higher priority during conflict resolution (described below). In other words, the tag scope 425c could be thought of as a higher-priority version of a group scope 425b. In some examples, the tag scopes 425c may further differ from the group scopes 425b in the type of membership criteria that are used to define membership. Specifically, in some examples, the membership criteria for a tag scope 425c may be intrinsic attributes of the networking device itself, such as the type of networking device (e.g., indoor APs, high density APs, clustered gateways, fabric switches, Power-over-Ethernet (PoE) switches, etc.) or a hardware capability of the device (e.g., devices with antennas), whereas the membership criteria for group scopes 425b do not directly relate to intrinsic attributes of the networking devices and instead may be use-case based or arbitrary groupings. In some implementations, the network 190 may assign tags to the network devices 191, wherein the tags indicate a type or hardware capability for the networking device 191, or other identifying information from which the type or hardware can be determined (such as a model number), and the scope hierarchy manager 420 may rely on these tags when determining which devices stratify the membership criteria of the tag scopes 425c.

In the example of FIG. 4, the devices 427_6 and 427_8 happen to belong to the tag scope 425c. As with the group scopes, devices 427 which belong to the same tag scope 425c as one another do not necessarily have to belong to the same site scope 426a or even site collection scope 425a as one another (although they certainly can). Although not illustrated, in some examples, a device 427 can belong to both a tag scope 425c and a group scope 425b.

In some examples, the scope hierarchy manager 420 may be configured to automatically generate tag scopes 425c based on identifying information provided by the network 190. For example, the scope hierarchy manager 420 may receive information about the tags applied by the network 190 and automatically generate tag scopes 425c based on the tags present in the network 190. As another example, the scope hierarchy manager 420 may automatically generate tag scopes 425c for certain pre-specified device types and/or hardware capabilities. In these examples, the tag scopes 425c may still be considered "user defined" in the sense the user causes (or allows) the information which is used to generate the scopes 425c to be received by the manager 420.

In some examples, in addition to or in lieu of automatic definition by the manager 420 of tag scopes 425*c*, the scope hierarchy manager 420 may be configured to allow the user to explicitly define tag scopes 425*c*. For example, in some implementations the scope hierarchy manager 420 may allow the user to specify the membership criteria (e.g., device type) for a tag scope 425*c*, and then the manager 420 may automatically determine and assign membership in the tag scope 425*c* based on the membership criteria. In some examples, the scope hierarchy manager 420 may store a set of pre-specified membership criteria (e.g., device types) and may be configured to allow the user to select from among this set when defining a tag scope 425*c*. In some examples, the scope hierarchy manager 420 may allow the user to arbitrarily specify membership criterion.

Although not illustrated, the scope hierarchy 421 could also include other non-geographical scopes and/or other geographically defined scopes beyond those shown and described. Moreover, additional tiers of scopes could be included beyond those shown and described. For example, additional geographic scopes (not illustrated) which are subordinate to the site scopes 426*a* may be defined which correspond to geographical divisions smaller than that of the sites. As another example, additional geographic scopes (not illustrated) which are superordinate to the site-collection scopes 425*a* may be defined which correspond to geographical divisions larger than that of the site collections. As yet another example, additional group scopes (not illustrated) subordinate to the group scopes 425*b* may be defined, or additional tag scopes (not illustrated) subordinate to the tag scopes 425*c* may be defined.

The scope hierarchy manager 420 also comprises a user interface 428 which allows the user to make inputs to the scope hierarchy manager 420. The user interface 428 may also provide outputs back to the user, such as display information which can be displayed by a display device. The user interface 428 may include a graphical user interface (GUI), a command line interface (CLI) or other text-based interface, an application programming interface (API), and/or any other type of user interface which can allow for user input and/or output. The inputs which the user may input into the scope hierarchy manager 420 via the interface 428 may include an input to add a new scope 422 or hierarchical relationship 423, an input to edit an existing scope 422 or hierarchical relationship 423, an input to delete an existing scope 422 or hierarchical relationship 423, an input to view information about a scope 422 or hierarchical relationship 423, or other types of inputs. Adding a new scope 422 and editing an existing scope 422 may both be referred to herein as defining the scope 422 or hierarchical relationship 423. Defining a scope 422 may comprise the user either explicitly specifying aspects of the scope 422 (such as a type for the scope 422 and hierarchical relationships 423 between the scope 422 and other scopes 422/devices 427) and/or the user causing the scope hierarchy manager 420 to automatically specify aspects of the scope 422 based on received information. The outputs which the user interface 428 may provide to the user may include, for example, text and/or graphics representing the scopes 422 currently extant in the scope hierarchy 421 and their hierarchical relationships, text and/or graphics representing options which the user may select during definition of a scope, other interactive features (e.g., buttons) which a user can select, etc.

Returning to FIG. 1, the logic 101 is configured to instantiate and run an object/scope mapper 130. The object/scope mapper 130 is a logical entity (e.g., program, routine, etc.) configured to, when instantiated, receive definitions of and store one or more mappings 131, with each mapping 131 comprising a map (a logical relationship) between a configuration object 112 in the configuration library 110 and a scope 122 in a scope hierarchy 121 of the scope hierarchy manager 120. More specifically, the object/scope mapper 130 may be configured to receive and store definitions of mappings 131 between the objects 112 and the scopes 122 as defined by a user. A given configuration object 112 may be mapped to any number of scopes 122 (including zero), and a given scope 122 may have any number of configuration objects 112 (including zero) mapped thereto.

Figure 5:
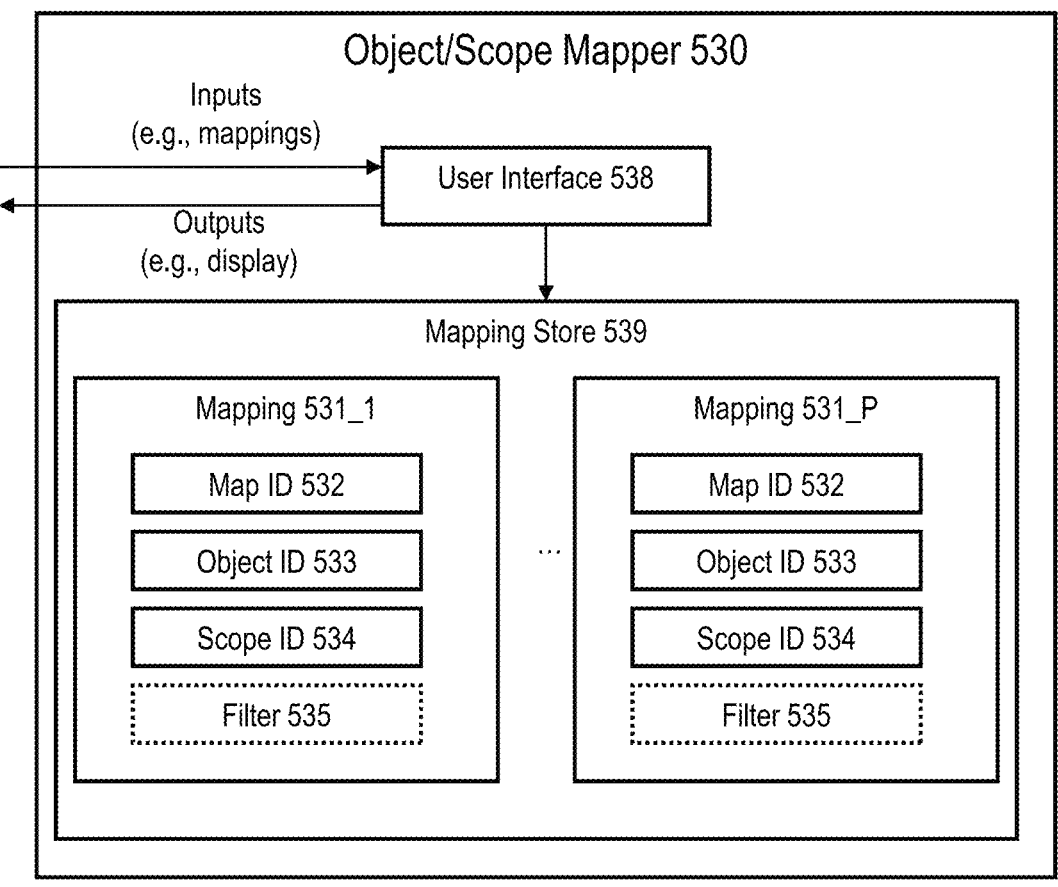
FIG. 5 is a block diagram illustrating an example object/scope mapper of a networking device configuration system.

Turning to FIG. 5, an example object/scope mapper 530 is illustrated which is one example implementation of the object/scope mapper 130. The object/scope mapper 530 comprises a mapping store 539 to store mappings 531. The mappings 531 are example implementations of the mappings 131 of FIG. 1. Any number of mappings 531 may be stored in the mapping store 539 (subject to the limitations of the hardware), with FIG. 5 illustrating mappings 531_1 to 531_P as one example (P being any integer equal to or greater than 2). Each mapping 531 comprises a data structure (e.g., table) specifying an object ID 533, which is information identifying the configuration object 112 in the configuration library 110 for which the mapping 531 is being made. Each mapping 531 also specifies a scope ID 534, which is information identifying one of the scopes 122 in the scope hierarchy 121 for which the mapping 531 is being made. When a given configuration object 112 and a given scope 122 are both specified in the same mapping 531, this means that the given configuration object 112 is mapped to the given scope 122 by the mapping 531. The object ID 533 and scope ID(s) 534 which define the mappings may be specified by a user. The mapping 531 may also comprise additional data, such as a map ID 532 to identify the mapping 531, and in some examples a filter 535 (described in more detail below).

Note that the same configuration object 112 can be mapped to multiple scopes 122. When this happens, each such map may be referred to herein as its own mappings 531 in the mapping store 539. However, this does not imply that the mappings 531 are necessarily stored or presented as separate data structures in the mapping store 539. In some examples, multiple mappings 531 could be combined in one data structure to simplify the data store and reduce space. For example, if multiple mappings 531 pertain to the same configuration object 112, then these could all be stored as part of a single data structure which may include just one instance of the Object ID 533 and multiple instances of the Scope ID 534 (one for each scope 122 to which the object 112 is mapped). Moreover, in some examples, the mappings 531 may all be collected together in the same table or database, which may have any desired or convenient organization.

The object/scope mapper 530 also comprises a user interface 538 which allows the user to make inputs to the object/scope mapper 530. The user interface 538 may also provide outputs back to the user, such as display information which can be displayed by a display device. The user interface 538 may include a graphical user interface (GUI), a command line interface (CLI) or other text-based interface, an application programming interface (API), and/or any other type of user interface which can allow for user input and/or output. The inputs which the user may input into the object/scope mapper 530 via the interface 538 may include an input to add a new mapping 531, an input to delete an existing mapping 531, an input to view information about a mapping 531, or other types of inputs. Defining a mapping

531 may comprise the user specifying the object ID 533 and at least one scope ID 534 (or if editing an existing mapping, then changing one of these or adding additional information). The outputs which the user interface 538 may provide to the user may include, for example, text and/or graphics representing the mappings 531 currently extant in the mapping store 539 and their associated data.

In the discussion above, user interfaces 218, 428, and 538 were described seperately for ease of understanding, but in practice some or all aspects of the user interfaces 218, 428, and/or 538 could be combined together in the same user interface. For example, in some implementations, the system 100 may have a single unified user interface which combines functionalities of all of the user interfaces 218, 428, and 538.

In the discussion above, user object store 219, scope hierarchy store 229, and mapping store 539, and data structures stored therein, were described seperately for ease of understanding, but in practice some or all aspects of these stores and/or their data structures could be combined together in the one or more combined stores and/or one or more combined data structures. For example, in some implementations, the system 100 may include a relational database which encompasses each of the object store 219, scope hierarchy store 229, and mapping store 539, with the relational database comprises various tables or other data structures which are related to one another.

Returning to FIG. 1, the logic 101 is configured to instantiate and run a configuration applying unit 140. The configuration applying unit 140 is a logical entity (e.g., program, routine, etc.) configured to, when instantiated, automatically apply configurations to networking devices 191 of the network 190 based on the configuration objects 112, scopes 122, and mappings 131. In particular, the configuration applying unit 140 is configured to monitor the other elements of the system 100 and automatically apply configurations to the network 190 in response to mappings 131 being defined (i.e., in response to a configuration object 112 being mapped to a scope 122). That is, in response to a given mapping 131 being defined, the unit 140 will automatically apply each configuration property of the configuration object 112 of that mapping 131 to each networking device belonging to the scope 122 of the given mapping 131. This may include the unit 140 sending one or more communications (labeled "config" in FIG. 1) to the appropriate networking devices 191 via the communication interface 106, wherein the communications include information corresponding to the configuration properties specified in the configuration object 112 of the mapping 131, as well as instructions, commands, requests, or any other information which will cause the networking devices 191 to apply the specified configuration properties. Conversely, in response to a previously established mapping 131 being deleted, the unit 140 will send communications to each of the networking devices belonging to the scope 122 specified in the now deleted mapping 131 which are tailored to cause the devices to remove the configuration properties of the configuration object 112 of the now-deleted mapping 131.

In some examples, the configuration applying unit 140 may also be configured to automatically apply configurations to the network 190 in response to a configuration object 112 or scope 122 which has previously been mapped being edited. Note that the definition of new objects 112 or scopes 122 or the editing of existing objects 112 or scopes 122 does not by itself result in any configurations being applied by the unit 140 to the network 190. Instead, in some examples, configurations are applied to the network 190 only after an object 112 has been mapped to a scope 122 and only in accordance with the corresponding mapping 131. However, if such a mapping 131 already exists and then subsequently the mapped object 112 or scope 122 are edited, then in some examples, this may trigger the unit 140 to change configurations of the network 190. For example, if one or more configuration properties of a given configuration object 112, which has previously been mapped, are later changed, then the unit 140 may send communications to each of the networking devices 191 of the scope(s) 122 to which the given configuration object 112 are mapped which cause the networking devices 191 to incorporate the changes in configuration information. As another example, if a given scope 122 to which one or more configuration objects 112 have been mapped is changed by the addition of a new device to the scope 122, then the unit 140 may send communications to that newly added device to cause it to apply the configuration properties of each configuration object 112 which is mapped to the given scope 122. On the other hand, if the given scope 122 is changed by the removal of a device from the scope, the unit 140 may send communications to the removed device to cause it to remove the configuration properties of the previously mapped configuration object(s) 112.

Figure 6:
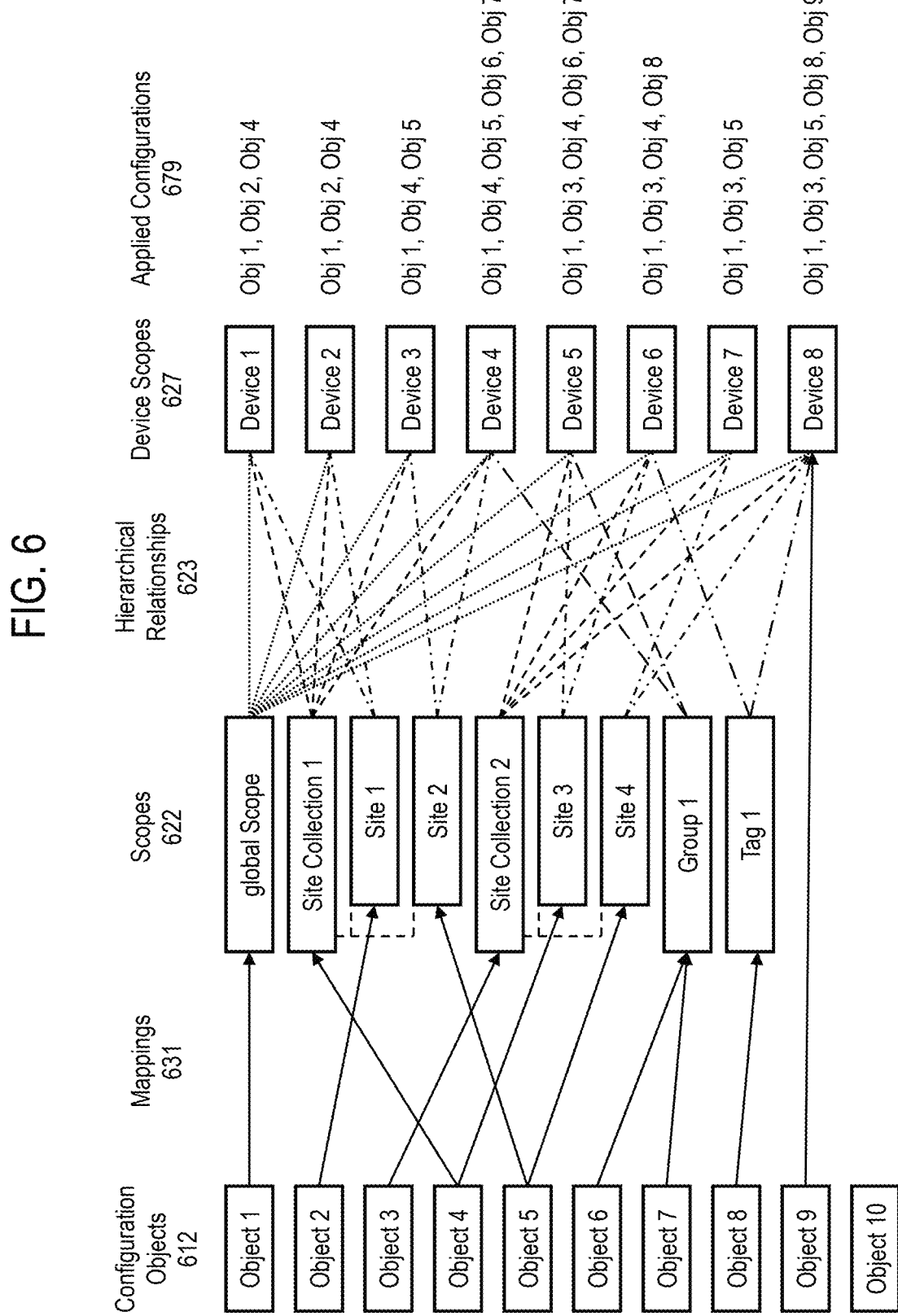
FIG. 6 is a block diagram illustrating a state of a networking device configuration system in which objects, scopes, and mappings have been defined.

Turning to FIG. 6, a hypothetical application of the system 100 will be described to illustrate some of principles of its operation. In this hypothetical example, the scope hierarchy 421 from FIG. 4 is assumed. In FIG. 6, eleven configuration objects 612 are arranged in a column on the left side of the figure, ten scopes 622 are arranged in a column in the middle of the figure, and eight device scopes 627 are arranged in a column on a right side of the figure. The configuration objects 612 represent examples of configuration objects 112 which have been defined by a user in the configuration library 110. Furthermore, the scopes 622 represent higher order scopes 122 which have been defined by a user in the scope hierarchy manger 120. The device scopes 627 represent device scopes 127, with each device scope 627 corresponding to an individual networking device 191.

FIG. 6 also illustrates mappings 631 between the objects 612 and the scopes 622 or device scopes 627. The mappings 631 correspond to mappings 131 which have been defined by a user and are depicted in FIG. 6 by arrows. Each arrow extends from one object 612 to one scope 622 or device scope 627 to indicate that that object 612 is mapped to that scope 622 or device scope 627.

FIG. 6 also illustrates hierarchical relationships 623 between the higher order scopes 622 and the device scopes 627 in the form of broken lines which connect the scopes 622 and device scopes 627. Each broken line connects a given scope 622 to either another scope 622 or a device scope 627 which is subordinate to the given scope 622. The relationships 623 in this example reflect the scope hierarchy 421 from FIG. 4.

FIG. 6 also illustrates, in a right-most column applied configurations 679. These indicate which configurations are applied by the system 100 to the networking devices 191 based on the mappings 631. Specifically, each row in the column of applied configurations 679 includes a list of configurations. The configurations listed in a given row of the Applied Configurations 679 column indicate configurations which are applied to the networking device 191 which correspond to the Device Scope 627 positioned adjacent to the given row of Applied Configuration 679 in FIG. 6. For example, the networking device 191 corresponding to Device 1 has configurations Obj 1, Obj 2, and Obj 4 applied thereto, the networking device 191 corresponding to Device 2 has configurations Obj 1, Obj 2, and Obj 4 applied thereto, the networking device 191 corresponding to Device 3 has configurations Obj 1, Obj 4, and Obj 5 applied thereto, and so on. The configurations are represented in FIG. 6 using the form "Obj n" wherein "n" is a number and "Obj n" indicates the configuration associated with the nth configuration object 612. Thus, Obj 1 indicates the configuration associated with Object 1 of the configuration objects 612, Obj 2 indicates the configuration associated with Object 2 of the configuration objects 612, and so on.

As shown in FIG. 6, object 1 is mapped to the global scope. This results in the configuration of object 1 being applied to all Devices 1-8, as all of the networking devices belong to the global scope. Note that the user only had to enter configuration information associated with object 1 one time (while defining object 1), and yet the configuration can be applied to multiple devices as a result of object 1 being mapped to the global scope.

Object 2 is mapped to site 1. This results in the configuration of object 2 being applied to Devices 1 and 2, as these devices belong to site 1. Note that the configuration of object 2 is not applied to any other devices because object 2 has not been mapped to any other scopes.

Object 3 is mapped to site collection 2. This results in the configuration of object 3 being applied to each of Devices 5-8. Devices 5-8 receive the configuration because they belong (indirectly) to site collection 2 (via their inclusion in sites 3 and 4, which both belong to site collection 2).

Object 4 is mapped to site collection 1 and to site 3. This results in the configuration of object 4 being applied to each of Devices 1-6. Devices 1-4 receive the configuration because they belong (indirectly) to site collection 1 (via their inclusion in sites 1 and 2, which both belong to site collection 1). Devices 5 and 6, on the other hand, receive the configuration because they belong to site 3. These mappings of Object 4 illustrate how the system 100 can allow for the same configuration to easily be applied to multiple devices within a same level of a hierarchy without the user needing to reenter the configuration information multiple times. Specifically, in this example, the user was able to apply the configuration to the devices of sites 1, 2, and 3 while excluding the configuration from site 4, all while only having to enter the configuration information once (while defining Object 4). If this were attempted using the configuration node approach, the administrator would have had to re-enter the same configuration information at least three times, i.e., once for each of three configuration nodes corresponding to the sites 1-3, as was explained above.

Object 5 is mapped to site sites 2 and 4. This results in the configuration of object 5 being applied to each of Devices 3, 4, 7, and 8. Devices 3 and 4 receive the configuration because they belong to site 2, and Devices 7 and 8 receive the configuration because they belong to site 4. These mappings of Object 5, like the mappings of Object 4, illustrate how the system 100 can allow for the same configuration to easily be applied to multiple devices within a same level of a hierarchy without the user needing to reenter the configuration information multiple times. Specifically, in this example, the user was able to apply the configuration to the devices of sites 2 and 4 while excluding the configuration from sites 1 and 3, all while only having to enter the configuration information once (while defining Object 5). If this were attempted using the configuration node approach, the administrator would have had to enter the same configuration information at least twice, i.e., once for each of the configuration nodes corresponding to the sites 2 and 4.

Objects 6 and 7 are both mapped to the group 1 scope. This results in the configuration of objects 6 and 7 being applied to each device which is a member of the group 1 scope, which in this example includes devices 4 and 5. This example illustrates that multiple objects can be mapped to the same group scope, and that members of a group scope can also be members of a site scope.

Object 8 is mapped to the tag 1 scope. This results in the configuration of object 8 being applied to each device which is a member of the tag 1 scope, which in this example includes devices 6 and 8.

Object 9 is mapped directly to device 8. This results in the configuration of object 9 being applied to only device 8. This illustrates that objects can be mapped directly to individual device scopes 127.

Object 10 is not mapped to any scopes and thus the configuration of object 10 is not applied to any devices. If the object 10 is subsequently mapped to a scope, the configuration thereof may then be applied accordingly. This decoupling of the definition of the objects from the application of their configurations may allow the objects to be developed or tested without negatively affecting the network 190, and then when the object is ready to be rolled out to the network 190 this can be achieved easily by the user mapping the object to one or more scopes (without the user needing to reenter the configuration information).

Figure 7:
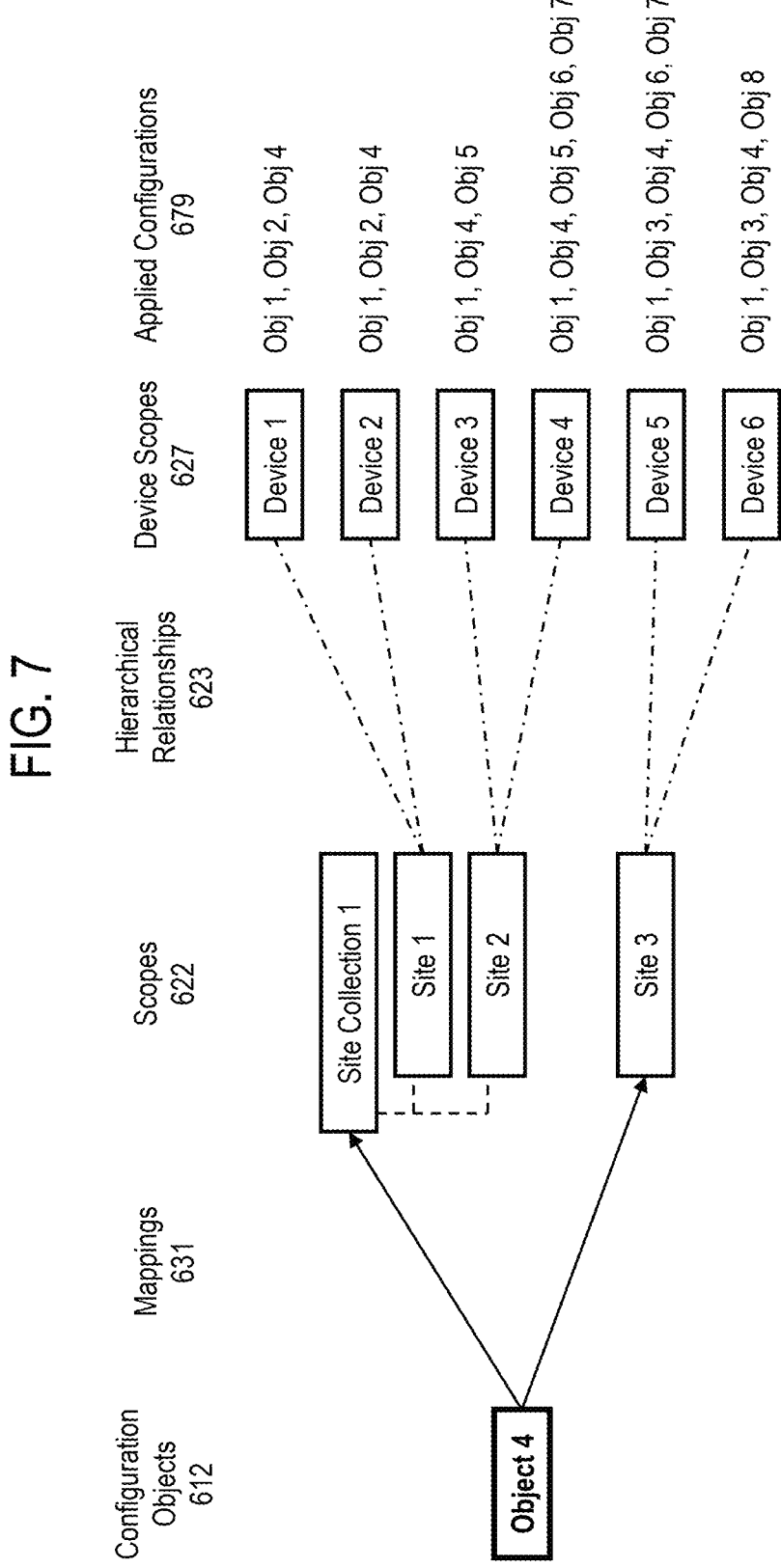
FIG. 7 is a block diagram illustrating example information output by a networking device configuration system.

In addition to allowing for easier configuration of the networking devices, the system 100 may allow for better visualization by the user of how the network is configurated. For example, the system 100 may be configured to allow a user to select a configuration object 112 in the configuration library 110 and, in response, present the user text and/or graphical outputs which indicate each of the scopes and devices to which the configuration object is mapped. For example, FIG. 7 illustrates hypothetical information output from the system 100 in response to a user selecting the object 4, with the system informing the user that object 4 is mapped to site collection 1 and site 3, and further than these scopes are mapped to devices 1-6. This allows the user to see at a glance all of the scopes and devices to which any configuration has been applied.

Figure 8:
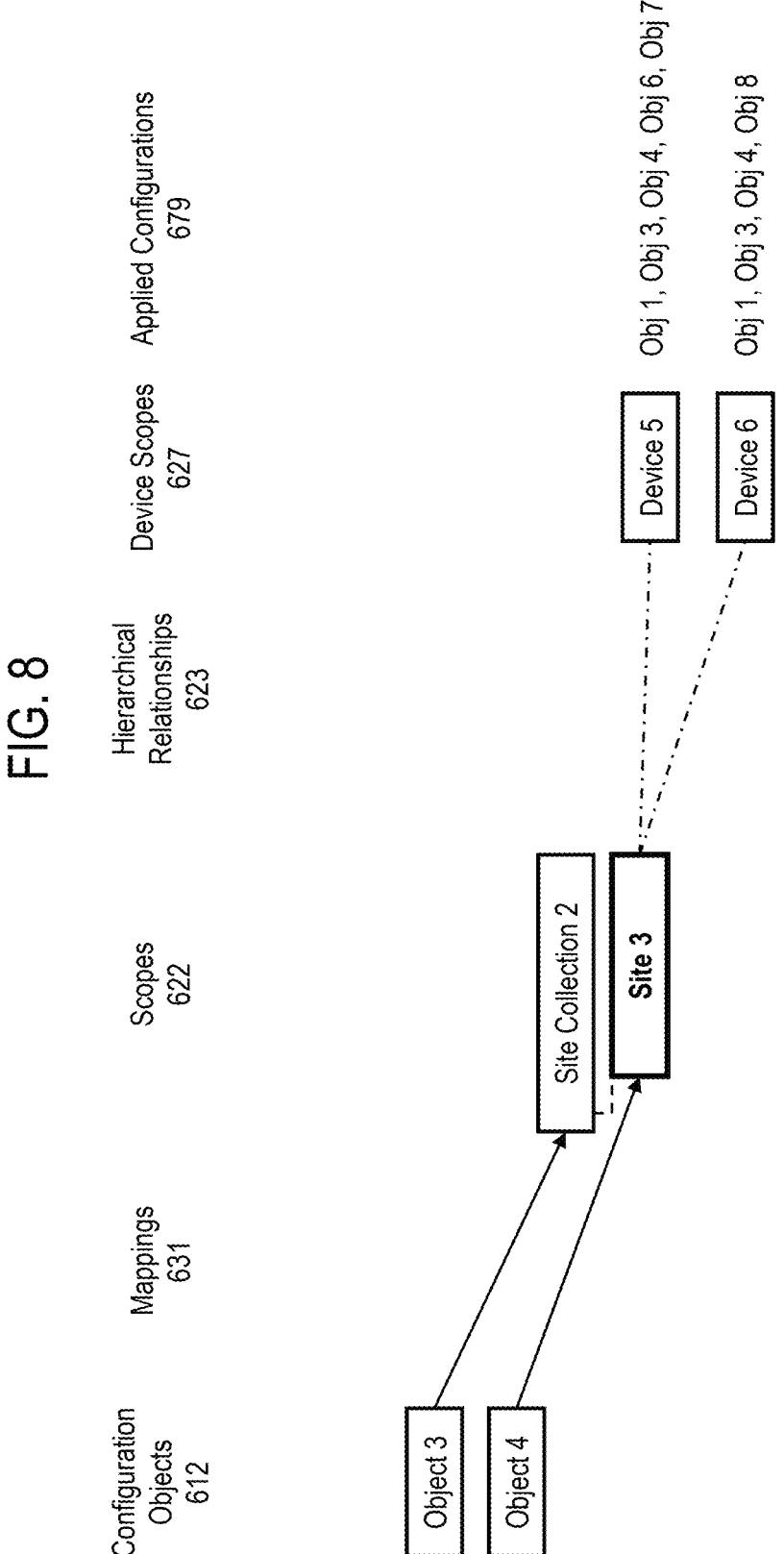
FIG. 8 is a block diagram illustrating example information output by a networking device configuration system.

In some examples, the system 100 may be configured to allow a user to select a scope 122 in the scope hierarchy manager 120 and, in response, present the user text and/or graphical outputs which indicate each of the configuration objects 112 which are mapped to the selected scope 122 and also each of the devices which belong to the selected scope 122. For example, FIG. 8 illustrates hypothetical information output from the system 100 in response to a user selecting the Site 3, with the system showing the user that objects 3 and 4 are mapped to site 3 (object 3 being mapped directly to site 3, object 4 being mapped indirectly to site 3 via a direct mapping to site collection 2), and further showing that the site 3 scope is mapped to devices 5 and 6. This allows the user to see at a glance all of the configurations which have been applied to a scope and all of the devices which belong to that scope. The system 100 may also show other hierarchical relationships related to the selected scope, such as in FIG. 8 where it is shown that site 3 is subordinate to site collection 2.

Figure 9:
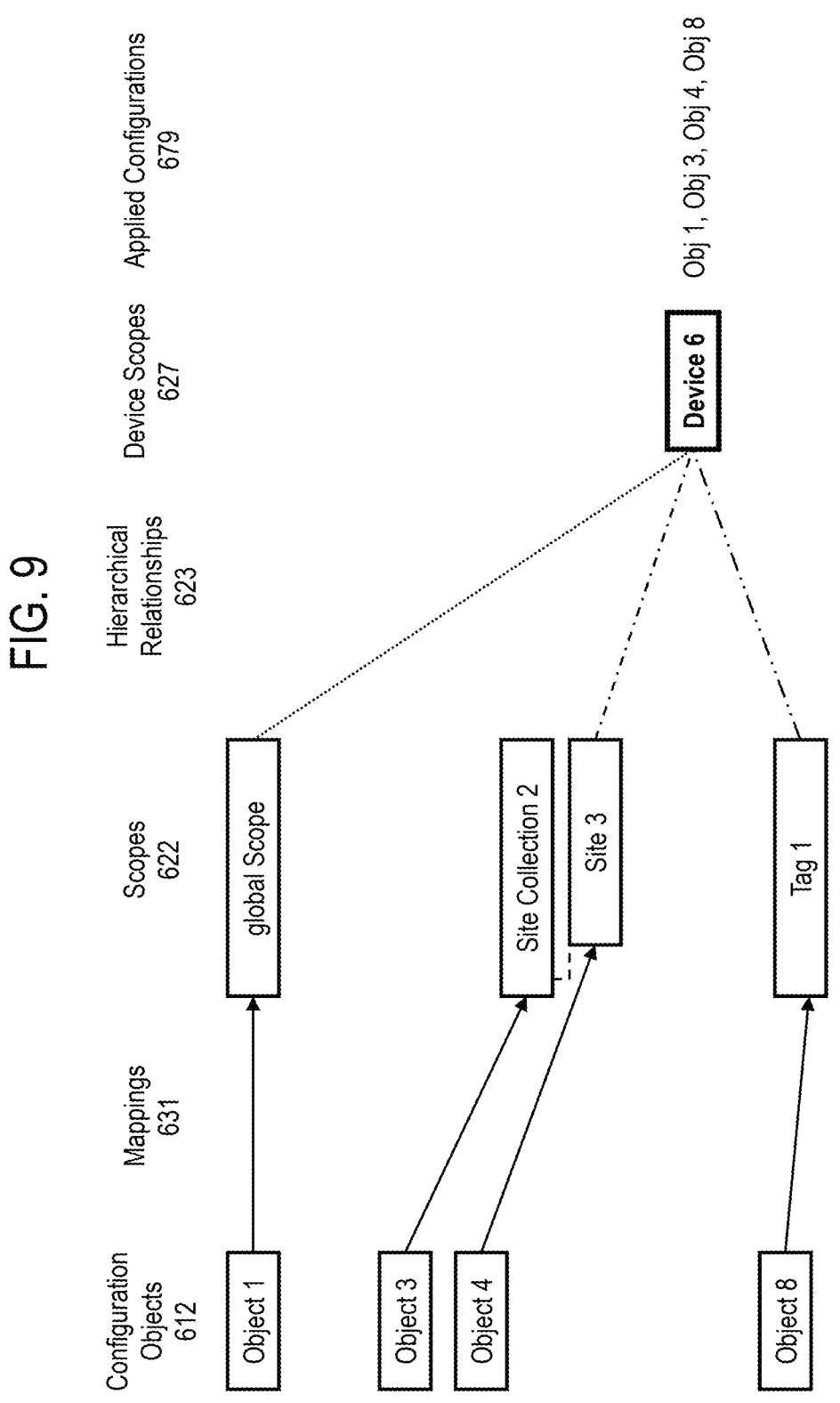
FIG. 9 is a block diagram illustrating example information output by a networking device configuration system.

In some examples, the system 100 may be configured to allow a user to select an individual device scopes 127 in the scope hierarchy manager 120 and, in response, present the user text and/or graphical outputs which indicate each of the higher level scopes 122 to which the device scope 127 belongs as well as each of the configuration objects 112 which are mapped, directly or indirectly, to the selected device scope 127. For example, FIG. 9 illustrates hypothetical information output from the system 100 in response to a user selecting the Device 6, with the system showing the user that Device 6 is subordinate to the Global scope, the Site Collection 2 scope, the Site 3 scope, and the Tag 1 scope, and also that objects 1, 3, 4, and 8 are mapped (indirectly) to Device 6 via these other scopes. This allows the user to see at a glance all of the scopes to which the device belongs and the configurations applied thereto.

Note that FIGS. 7-9 are intended to show examples of the types of information which may be conveyed to the user, but are not necessarily intended to limit the form in which the information could be conveyed. In particular, the information from any of FIGS. 7-9 could be conveyed in any desired graphical form or in a purely textual form (e.g., a text list or table).

Figure 10:
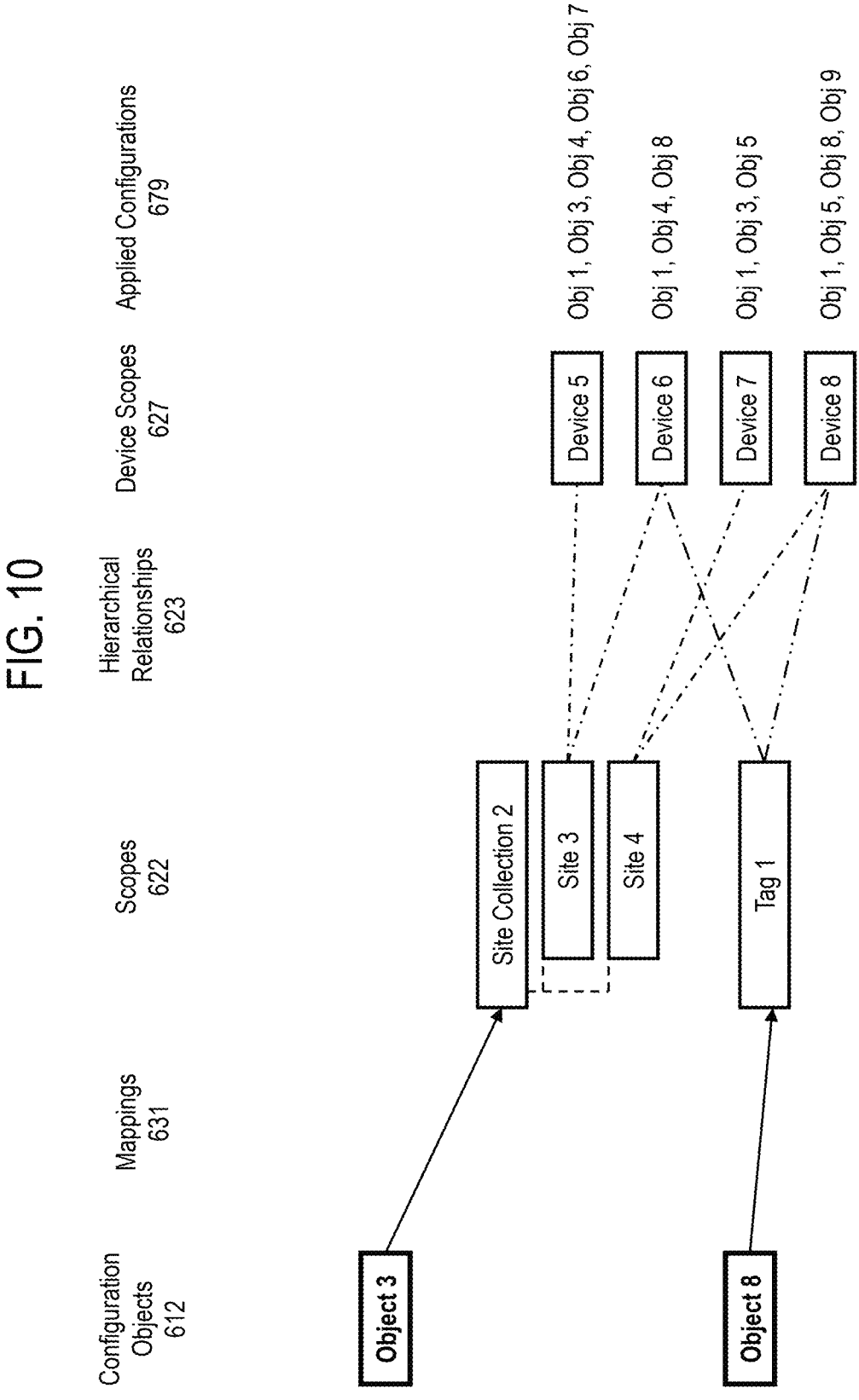
FIG. 10 is a block diagram illustrating conflict resolution between conflicting configuration objects mapped to the same devices in a networking device configuration system.

Turning to FIG. 10, the resolution of conflicts between configurations will now be described. It may be the case that the configurations of some configuration objects 112 defined in the configuration library 110 may conflict with one another or may be mutually exclusive. If two configuration objects 112 with conflicting configurations are both mapped to the same device via mappings to different scopes, the system 100 may automatically select one of the configurations to apply to the device and disregard the other. The system 100 may make this determination based on priorities which are assigned to different scopes 122. When a conflict occurs, the configuration object 112 which is mapped to the higher priority scope 122 is the one which is applied. These priorities may be user defined in some examples, pre-defined and user adjustable in other examples, or pre-defined and not user-adjustable in other examples. For example, in some implementations of the system 100 in which the scopes 122 can include a Global Scope, a Site Collection scope, a Site Scope, a Group Scope, a Tag Scope, and an individual Device Scope, the priorities of these scopes may be given the following pre-defined priorities (increasing priority from left to right):

Global<Group<Site Collection<Site<Tag<Device

Supposing that, in FIG. 10, configuration objects 3 and 8 conflict with one another, then using the priorities described above the system 100 may resolve the conflict by applying configuration object 8 to devices 6 and 8, instead of applying configuration object 3 thereto. This is because object 8 is mapped to a tag scope and object 3 is mapped to a site collection scope, and in the priority scheme defined above tag scopes have higher priority than site collection scopes. Thus, even though Object 3 is mapped (indirectly) to devices 6 and 8, the configuration Obj 3 is not applied to devices 6 and 8. However, the configuration Obj 3 is still applied to devices 5 and 7 because the conflicting configuration of object 8 is not mapped to devices 5 and 7.

If two conflicting configurations are mapped to the same scope, then in some examples the system 100 may raise an error. In other examples, the system 100 may pick one of the conflicting configurations to use according to predefined secondary conflict resolution rules, such as picking the most recently defined configuration object 112 or the most recently mapped configuration object 112.

Figure 11:
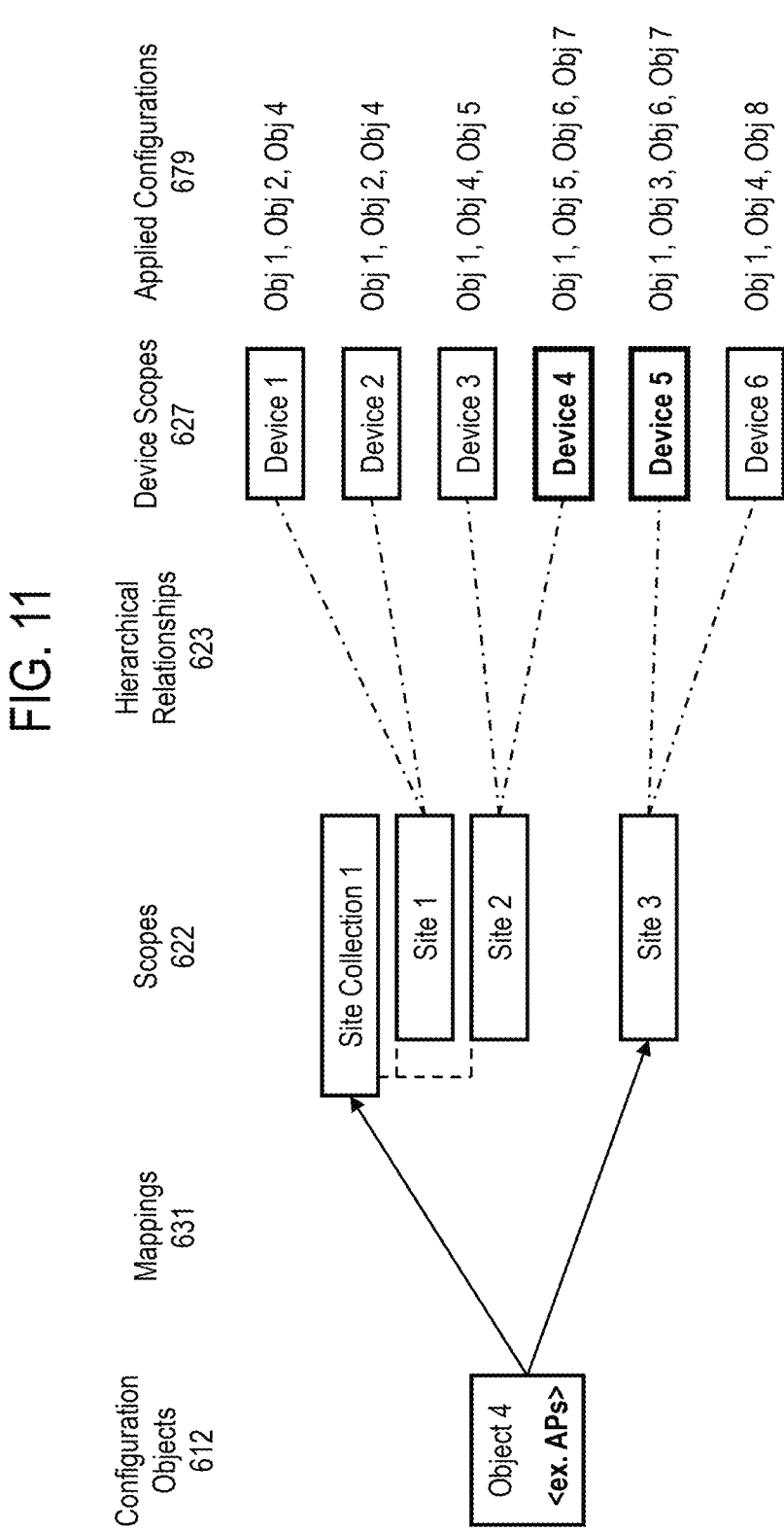
FIG. 11 is a block diagram illustrating a filter applied to a configuration object in a networking device configuration system.
Figure 12:
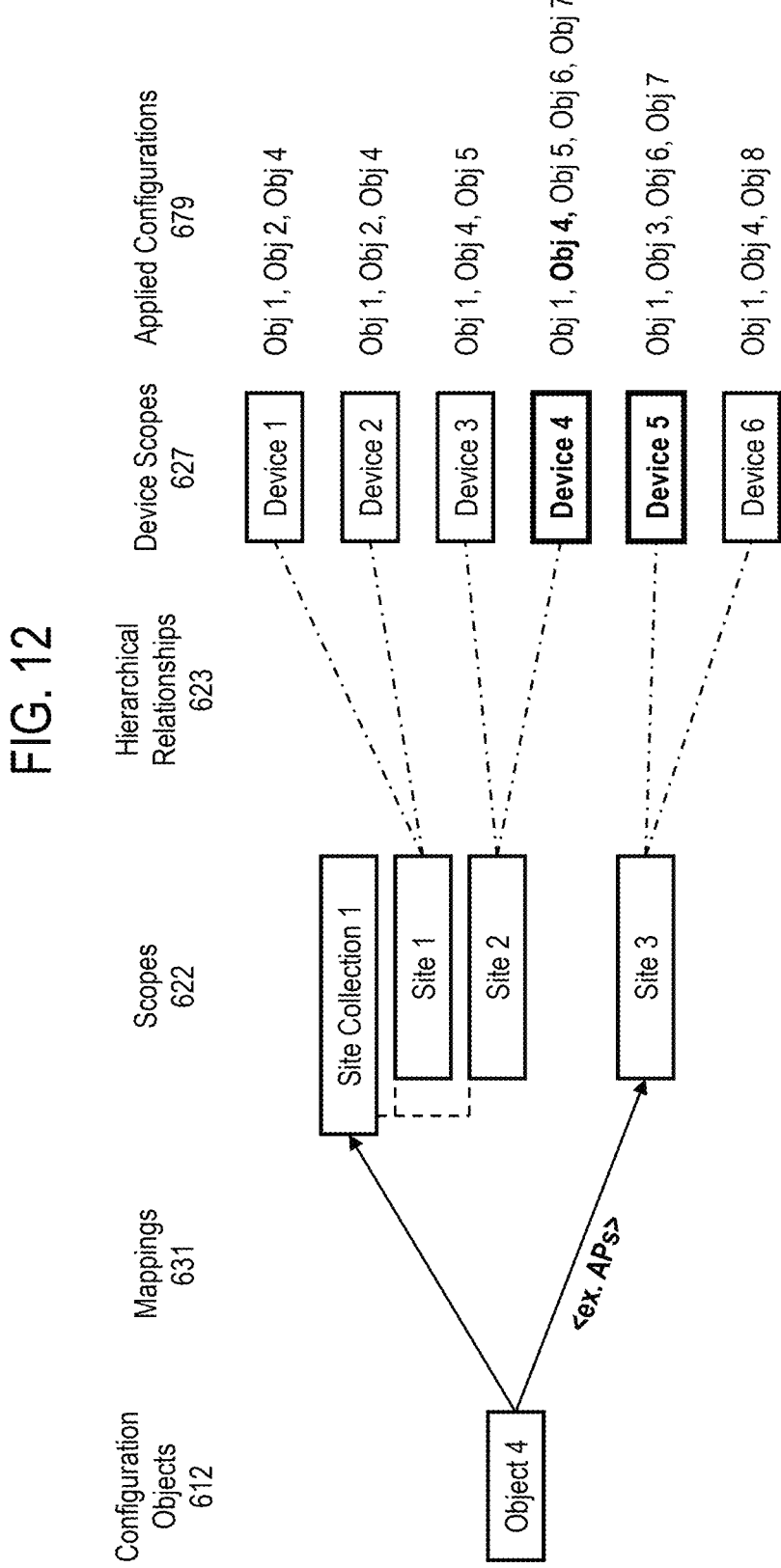
FIG. 12 is a block diagram illustrating a filter applied to a mapping in a networking device configuration system.

Turning to FIG. 11, filters will now be described. In some cases, the system 100 may be configured to prevent certain configurations from being applied to certain networking device 191 even if those configurations would have otherwise been applied thereto according to the mappings 131.

This may be referred to as filtering, and the rules which the system 100 uses for such filtering may be referred to as filters.

In some examples, the system is configured to automatically apply one or more global filters to all configuration objects 112 and/or mappings 131. The global filters may include, in some examples, an implicit global filter that a configuration is only to be applied to network devices that support that configuration. For example, a configuration which relates to a wireless antenna will only be applied to networking devices which have an antenna. The filter is implicit in the sense that the user does not need to explicitly define it or enable it, but instead the system 100 automatically acts as though the filter is in place. The implicit global filter can make it easier for the user to configure the networking devices by relieving the user of the burden of having to consider hardware compatibility when defining configuration objects, scopes, or mappings.

In some examples, the system is also configured to automatically apply one or more explicit filters. These explicit filters can be global filter which apply to all objects, scopes, and mappings, or the explicit filters can be more narrowly defined. The explicit filters may be defined by a user, with the filter preventing application of configuration to networking devices based on filtering criteria specified by the user. The filtering criteria may, for example, specify device type, device hardware, device use case, or any other user-defined filtering criteria.

In some examples, the explicit filters can be defined for individual configuration objects 112. For example, in FIG. 2 the configuration objects 112 may each optionally comprise a Filter 215 field in which a user can define an explicit filter for that configuration object 212. When an explicit filter is defined in the Filter 215 field of a given configuration object 212, this filter is then used whenever that configuration object 212 is mapped but is not necessarily used for other configuration objects 212. For example, as shown FIG. 11, if the configuration Object 4 has a filter specified therein of "excluding AP," then the configuration Obj 4 will not be applied to any APs to which the Object 4 is mapped—e.g., supposing that Devices 4 and 5 are APs, then the configuration Obj 4 is not applied to these devices. However, this "excluding APs" filter is applied only in relation to Object 4 and not in relation to other objects (unless explicitly defined in relation to those objects as well), and therefore the devices 4 and 5 still receive the other configurations which they would normally receive.

In some examples, the explicit filters can be defined for mappings 131. For example, in FIG. 5 the Mappings 531 may each optionally comprise a Filter 535 field in which a user can define an explicit filter for that mapping 531. When an explicit filter is defined in the Filter 535 field of a given Mappings 531, this filter is then applied for that particular mapping 531 but not necessarily others. For example, as shown FIG. 12, if the explicit filter of "excluding APs" is defined in relation to the mapping of the configuration Object 4 to site 3, then the configuration Obj 4 will not be applied to any APs in site 3. However, because the filter was defined at the mapping level and not at the object level, the configuration object 4 may be applied to APs via other mappings. For example, supposing that Devices 4 and 5 are both APs, then the configuration Obj 4 is not applied to Device 5 (because of the filter defined for the mapping of Object 4 to site 3) but the configuration Obj 4 is applied to Device 4 (because the mapping of Object 4 to site collection 1 does not contain any filter).

Turning now to FIG. 13, an example method of configuring networking devices of a network will be described. The method may be performed, for example, by a user utilizing a networking configuration system such as the system 100 described above. Alternatively, the method may be performed, for example, by a networking configuration system such as the system 100 described above.

The method comprises, in bock 1302, defining (or receiving a definition of) one or more configuration objects in a configuration library of a networking device configuration system. The configuration object includes values specifying one or more configuration properties of a configuration for a networking device.

The method comprises, in bock 1304, defining (or receiving a definition of) a scope hierarchy in the system. The scope hierarchy is associated with the network which is to be configured and comprises multiple scopes which are arranged in a hierarchy. The scopes each correspond to a logical subdivision of the network. In some examples, some of the scopes correspond to geographically defined subdivisions of the network. In some examples, some of the scopes correspond to user-defined subdivisions of the network. The scopes include an individual device scope for each of the networking device in the network. The individual device scopes may each be subordinate to (belong to) at least one other scope. Each scope other than the device scopes may have one or more subordinate scopes, which may include device scopes or non-device scopes. Each scope other than a top or global scope may also be subordinate to another scope.

The method comprises, in bock 1306, defining (or receiving a definition of) a mapping in the system of a given configuration object from the configuration library to a given scope of the scope hierarchy.

The method comprises, in bock 1308, causing the system to, in response to the mapping, apply the configuration properties of the given configuration object to each networking device which belongs (directly or indirectly) to the given scope.

Figure 14:
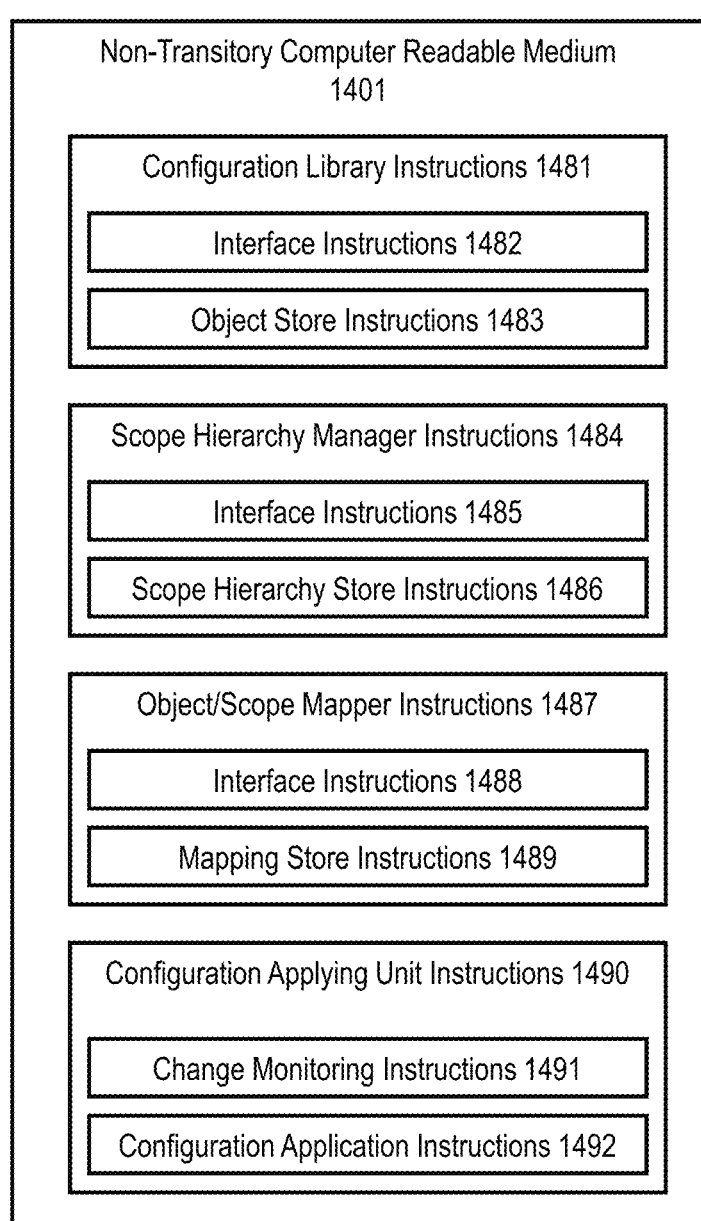
FIG. 14 is a block diagram illustrating an example computer program product.

Turning now to FIG. 14, an example computer program product 1400 will be described. The product 1400 comprises a non-transitory computer readable medium 1401 storing processor executable instructions. The non-transitory computer readable medium 1401 may include any data storage device which stores information in a non-transitory manner, such as a solid state drive, hard disk drive, optical storage media, non-volatile memory device, or any other data storage device. In some examples, the non-transitory computer readable medium 1401 may be used as an implementation of the data storage device 103 of FIG. 1.

The processor executable instructions stored in medium 1401 include configuration library instructions 1481. The configuration library instructions 1481 include instructions which, when executed, cause the processor to instantiate a configuration library such as the configuration library 110 described above or any of the example implementation thereof (such as configuration library 210 or 310). In particular, the configuration library instructions 1481 may include interface instructions 1482 which, when executed, cause the processor to establish a user interface such as user interface 218 described above. The configuration library instructions 1481 may also include object store instructions 1483 which, when executed, cause the processor to create an object store which is configured to receive definitions of and store configuration objects, such as object store 219 described above.

The processor executable instructions stored in medium 1401 also include scope hierarchy manager instructions 1486. The scope hierarchy manager instructions 1486 include instructions which, when executed, cause the processor to instantiate a scope hierarchy manager such as the scope hierarchy manager 120 described above or any of the example implementations thereof (such as scope hierarchy manager 420). In particular, the scope hierarchy manager instructions 1486 may include interface instructions 1485 which, when executed, cause the processor to establish a user interface such as user interface 428 described above. The scope hierarchy manager instructions 1486 may also include object store instructions 1487 which, when executed, cause the processor to create a scope hierarchy store which is configured to receive definitions of and store a configuration hierarchy, such as configuration hierarchy store 239 described above.

The processor executable instructions stored in medium 1401 also include object/scope mapper instructions 1487. The object/scope mapper instructions 1487 include instructions which, when executed, cause the processor to instantiate an object/scope mapper such as the scope object/scope mapper instructions 130 described above or any of the example implementations thereof (such as object/scope mapper instructions 530). In particular, the object/scope mapper instructions 1487 may include interface instructions 1488 which, when executed, cause the processor to establish a user interface such as user interface 538 described above. The object/scope mapper instructions 1487 may also include object store instructions 1487 which, when executed, cause the processor to create an object/scope mapper store which is configured to receive definitions of and store a mappings of configuration objects to scopes, such as object/scope mapper store 539 described above.

The processor executable instructions stored in medium 1401 also include configuration applying unit instructions 1490. The configuration applying unit instructions 1490 include instructions to instantiate a configuration applying unit which is configured to apply configurations according to the configuration objects and mappings, such as configuration applying unit 140 described above. The configuration applying unit instructions 1490 may include change monitoring instructions 1491 which comprise instructions to monitor for changes in mappings, scopes, and/or configuration objects. The configuration applying unit instructions 1490 may include configuration application instructions 1492 comprising instructions to, in response to a new mapping being defined of a configuration object to a scope, apply configuration properties of the configuration object to network devices belonging to the scope. In some examples, the configuration application instructions 1492 also comprise instructions to, in response to a change in a previously mapped configuration object or a change in a previously mapped scope, update configurations of networking devices according to the changes.

Figure 15:
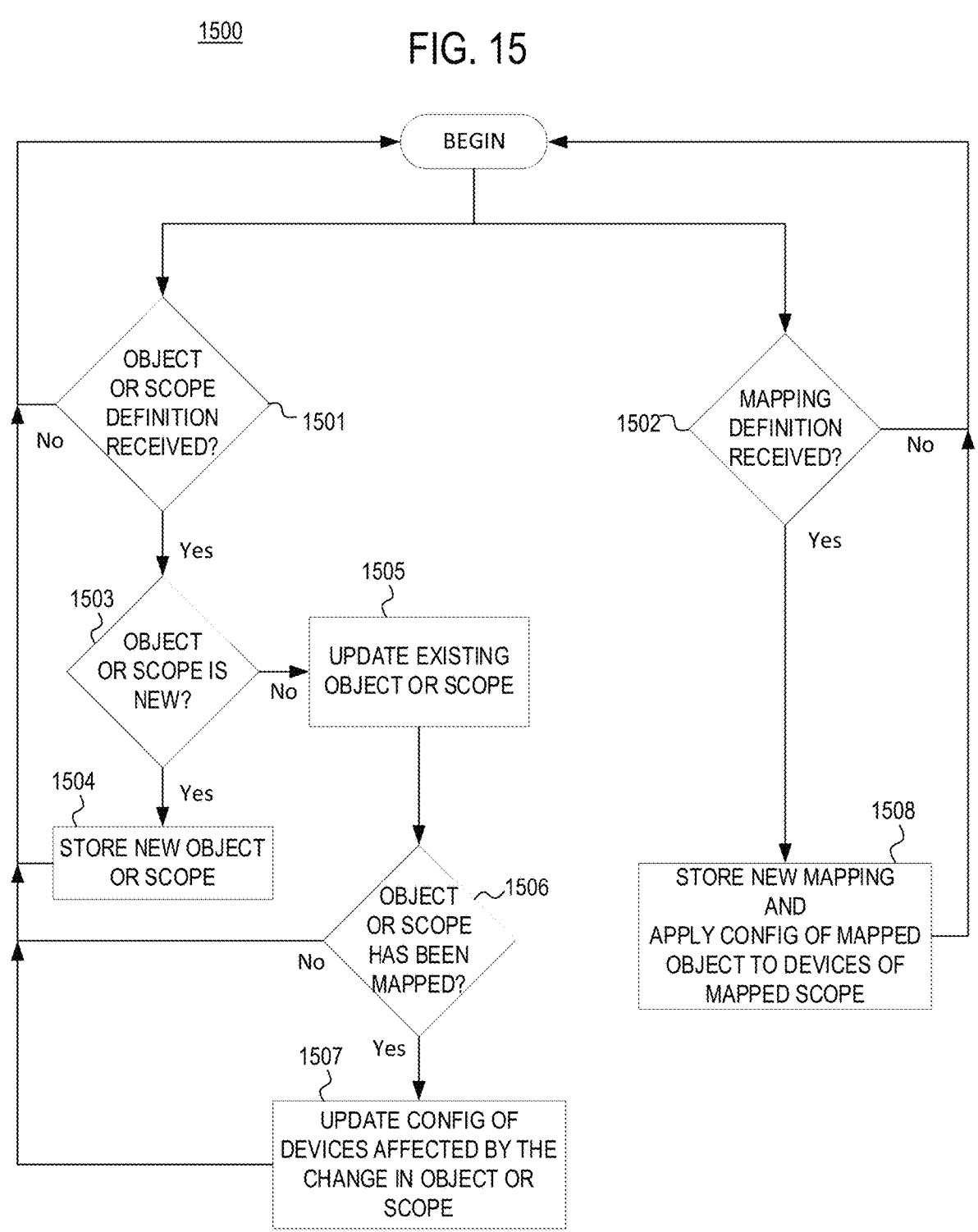
FIG. 15 is a process flow chart illustrating an example method.

Turning now to Turning now to FIG. 15, an example method 1500 will be described. The method 1500 may be performed, for example, by the configuration applying unit 140. In some examples, configuration applying unit instructions 1490 may include instructions corresponding to the method 1500.

The method begins and proceeds to blocks 1501 and 1502, which may be performed concurrently or in any order. In block 1501, it is determined whether an object or scope definition is received. The definitions can include definitions of new objects/scopes, or they can include changes/edits to previously defined objects/scope. In block 1502, it is determined whether a mapping definition is received. If no object/scope definition is received in block 1501, the process loops back to the beginning and starts again. Similarly, if no mapping definition is received in block 1502, the process loops back to the beginning and starts again. However, if either an object/scope definition is receive in block 1501 or a mapping definition is received in block 1502, the process proceeds down one of the corresponding paths illustrate din FIG. 15. Specifically, if the determination of block 1501 is yes, the process continues to block 1503, and if the determination of block 1502 is yes, then the process continues to block 1508.

In block 1503, it is determined whether the definition receive in block 1501 is for a new object or scope, as opposed to being a change in an existing object/scope. If the answer is yes (the definition is for a new object or scope), the process continues to block 1504 where the new object or scope is stored in the object store or scope hierarchy store, and then the process loops back to the beginning. However, if the answer is yes (the definition is not for a new object or scope), then the process continues to block 1505 where the existing object or scope is updated according to the changes reflected in the received definition, after which the process continues to block 1506. In block 1506, it is determined whether the edited object or scope has previously been the subject of a mapping. If yes (the object or scope has been mapped), then the process continues to block 1507 and the system will update the configuration of all devices which are affected by the change which was made to the object or scope. The process then loops back to the beginning to wait for further definitions to be received. Thus, in blocks 1503-1507, when a definition of an object/scope is received, if the definition is for a new object or scope or reflets a change being made to an existing object or scope which has not yet been mapped, the new definition or the change is stored but no changes are made to the configurations of networking devices. On the other hand, if the definition reflects a change being made to an existing object or scope which has already been mapped, then changes in configuration are made to the networking devices in response to the change in the object or scope.

In block 1508, which is reached when a definition of a mapping is received in block 1502, the defined mapping is stored and the configuration of the configuration object of the mapping is applied to the networking devices of the scope of the mapping.

Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

As used herein, unless the context indicates otherwise, the indefinite and definite articles "a", "an", and "the" are open ended, meaning that they allow for the presence of multiple of the items to which the articles refer. In other words, "a," "an," and "the" should be understood herein as being equivalent in meaning to "at least one" or "the at least one" unless the context indicates otherwise. The fact that words referenced by the articles "a", "an", and "the" may be written herein in the singular form does not contraindicate the open ended nature of the articles—instead, the singular form may be used herein for certain words merely for the sake of grammatical consistency without implying any intent to limit the number of referenced items. For instance, the phrase "a widget" can allow for multiple widgets to be present. In contrast, the usage of phrases such as "a single" or "exactly one" may indicate that one-and-only-one of the referenced items is present.

Moreover, the terms "comprises", "comprising", "includes", and the like are also open ended, meaning that they specify the presence of stated features, steps, operations, elements, and/or components but do not preclude the presence or addition of one or more other features, steps, operations, elements, components, and/or groups.

Components described as coupled may be electronically or mechanically directly coupled, or they may be indirectly coupled via one or more intermediate components, unless specifically noted otherwise.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

The particular examples set forth herein are non-limiting. This means that modifications may be made to the examples disclosed without departing from the scope of the present disclosure and that additional examples which are not explicitly mentioned herein nevertheless may fall under the scope of the present disclosure, as will be apparent to those of ordinary skill in the art after having considered this disclosure. For instance, examples described herein may include additional components or steps that were omitted from the corresponding diagrams and description for clarity's sake. Or components or steps that were illustrated or described herein in relation to some examples could be omitted. Furthermore, elements and arrangements thereof which are illustrated and described herein may be substituted with other equivalent elements or arrangements. Moreover, certain features which are described together in the present disclosure for ease of description may be provided or utilized independently. In addition, elements or other aspects that are described in relation to one example may be included in other examples for which the elements or other aspects are not specifically mentioned, unless the inclusion would be logically contradictory. In other words, the disclosure encompasses not only the specific examples as explicitly described herein but also additional examples comprising all non-contradictory combinations of the described examples. In short, the following claims are intended to be construed to encompass the fullest breadth to which they are entitled, including equivalents, under the applicable law.

What is claimed is:

1. A networking device configuration system, comprising:
a processor;
a communication interface configured to be communicably connected to a network comprising networking devices; and
a data storage device storing instructions configured to, on condition of being executed by the processor, cause the system to:

instantiate a configuration library configured to receive and store definitions of configuration objects specifying configuration properties;

instantiate a scope hierarchy manager configured to receive and store definitions of scopes arranged in a scope hierarchy, wherein each of the scopes has one or more of the networking devices which belong thereto;

instantiate an object/scope mapper configured to receive and store mappings of the configuration objects to the scopes; and in response to receiving a given mapping of a given configuration object of the configuration objects to a given scope of the scopes, apply, via the communication interface, the configuration properties specified by the given configuration object to the one or more networking devices which belong to the given scope.

2. The system of claim 1, wherein the scope hierarchy is configured to store geographically defined scopes corresponding to geographical subdivisions of the network.

3. The system of claim 2, wherein the geographically defined scopes comprise site scopes corresponding to sites and site-collection scopes corresponding to regions comprising multiple of the sites, wherein the networking devices located at a given site belong to a site scope corresponding to the given site.

4. The system of claim 3, wherein the scope hierarchy is configured to store non-geographically defined scopes.

5. The system of claim 4, wherein the non-geographically defined scopes comprise group scopes, with each of the group scopes being superordinate to a user-defined group of the networking devices.

6. The system of claim 4, wherein tags are assigned to at least some of the networking devices, the tags identifying attributes of the associated networking devices;

wherein the non-geographically defined scopes comprise tag scopes; and wherein each of the tag scopes corresponds to one of the tags and is superordinate to a group comprising those of the networking devices having the corresponding tag.

7. The system of claim 6, wherein the scope hierarchy is configured to store a global scope to which all of the networking devices of the network are subordinate.

8. The system of claim 1, wherein each of the configuration objects can be mapped to multiple of the scopes and each of the scopes can have multiple configuration objects mapped thereto.

9. The system of claim 1, wherein for each of the configuration objects, in an unmapped state of the respective configuration object, the configuration properties of the respective configuration object are not applied by the system to any of the networking devices.

10. The system of claim 1, wherein the instructions are configured to, on condition of being executed by the processor, cause the system to:

in response to receiving a change in the configuration properties of the given configuration object after the given configuration object has been mapped to the given scope, automatically apply the change in the configuration properties to the networking devices which are subordinate to the given scope.

11. The system of claim 1, wherein the instructions are configured to, on condition of being executed by the processor, cause the system to:

in response to receiving an additional mapping of the given configuration object to an additional scope, automatically apply the configuration properties of the given configuration object to the networking devices which are subordinate to the additional scope.

12. A non-transitory computer readable medium storing instructions configured to, on condition of being executed by a processor, cause the processor to:

instantiate a configuration library configured to receive and store definitions of configuration objects specifying configuration properties;

instantiate a scope hierarchy manager configured to receive and store definitions of scopes arranged in a scope hierarchy, wherein each of the scopes has one or more of the networking devices which belong thereto;

instantiate an object/scope mapper configured to receive and store mappings of the configuration objects to the scopes; and in response to receiving a given mapping of a given configuration object of the configuration objects to a given scope of the scopes, apply the configuration properties specified by the given configuration object to the one or more networking devices which are subordinate to the given scope.

13. The non-transitory computer readable medium of claim 12, wherein the scope hierarchy is configured to store geographically defined scopes corresponding to geographical subdivisions of the network.

14. The non-transitory computer readable medium of claim 13, wherein the geographically defined scopes comprise site scopes corresponding to sites and site-collection scopes corresponding to regions comprising multiple of the sites, wherein the networking devices located at a given site belong to a site scope corresponding to the given site.

15. The non-transitory computer readable medium of claim 14, wherein the scope hierarchy is configured to store non-geographically defined scopes.

16. The non-transitory computer readable medium of claim 12, wherein each of the configuration objects can be mapped to multiple of the scopes and each of the scopes can have multiple configuration objects mapped thereto.

17. The non-transitory computer readable medium of claim 12, wherein for each of the configuration objects, in an unmapped state of the respective configuration object, the configuration properties of the respective configuration object are not applied by the processor to any of the networking devices.

18. The non-transitory computer readable medium of claim 12, wherein the instructions are configured to cause the processor to:

in response to receiving a change in the configuration properties of the given configuration object after the given configuration object has been mapped to the given scope, automatically apply the change in the configuration properties to the networking devices which are subordinate to the given scope.

19. The non-transitory computer readable medium of claim 12, wherein the instructions are configured to cause the processor to:

in response to receiving an additional mapping of the given configuration object to an additional scope, automatically apply the configuration properties of the given configuration object to the networking devices which are subordinate to the additional scope.

20. A computer-implemented method of configuring networking devices of a network, comprising:

defining one or more configuration objects in a configuration library, the configuration objects specifying configuration properties;

defining one or more scopes in a scope hierarchy for the network, wherein each of the scopes has one or more of the networking devices which belong thereto; and defining a mapping of a given configuration object of the configuration objects to a given scope of the scopes and, in response to the defining of the mapping, apply the configuration properties specified by the given configuration object to the one or more networking devices which belong to the given scope.

\*   \*   \*   \*   \*